(12) United States Patent
Yu et al.

(10) Patent No.: US 12,175,185 B2
(45) Date of Patent: Dec. 24, 2024

(54) DYNAMIC CONFIGURABILITY OF WEB PAGES

(71) Applicant: Brightedge Technologies, Inc., Foster City, CA (US)

(72) Inventors: Sammy Yu, San Mateo, CA (US); Jimmy Yu, Foster City, CA (US); Lemuel S. Park, Foster City, CA (US); Thomas J. Ziola, Menlo Park, CA (US); Meyyappan Alagappan, Fremont, CA (US)

(73) Assignee: BRIGHTEDGE TECHNOLOGIES, INC., Foster City, CA (US)

( * ) Notice: Subject to any disclaimer, the term of this patent is extended or adjusted under 35 U.S.C. 154(b) by 0 days.

(21) Appl. No.: 17/450,421

(22) Filed: Oct. 8, 2021

(65) Prior Publication Data

US 2022/0129509 A1  Apr. 28, 2022

Related U.S. Application Data

(60) Provisional application No. 63/089,495, filed on Oct. 8, 2020.

(51) Int. Cl.
*G06F 40/117* (2020.01)
*G06F 16/958* (2019.01)
(Continued)

(52) U.S. Cl.
CPC ......... *G06F 40/117* (2020.01); *G06F 16/958* (2019.01); *G06F 16/972* (2019.01);
(Continued)

(58) Field of Classification Search
CPC ..... G06F 40/117; G06F 16/958; G06F 16/972
See application file for complete search history.

(56) References Cited

U.S. PATENT DOCUMENTS 10,915,523 B1 * 2/2021 Paiz ................... H04L 67/52
11,640,438 B1 * 5/2023 Rosenblum ............ G06F 40/35
707/707

(Continued)

OTHER PUBLICATIONS

Amy Haddad, 'Inline CSS Guide—How to Style an HTML Tag Directly' found at https://www.freecodecamp.org/news/inline-css-guide-how-to-style-an-html-tag-directly/, Mar. 9, 2020, freecodecamp. org, 8 pages (Year: 2020).*

*Primary Examiner* — Scott T Baderman
*Assistant Examiner* — Seung Woon Jung
(74) *Attorney, Agent, or Firm* — Maschoff Brennan

(57) ABSTRACT

A method including accessing a website comprising one or more webpages. The method may also include determining, by a processor, one or more modifications to the one or more webpages of the web site configured to improve a search engine optimization (SEO) of the web site. The method may also include determining, by the processor, software code configured to enact the one or more modifications. The method may also include determining, by the processor, group-specific instructions configured to insert the software code into the one or more webpages of the website via attribute overwriting. The method may also include installing the group-specific instructions into an application stack of the web site so that device browsers executing code of the web site, to render the one or more of the webpages, execute the software code.

17 Claims, 6 Drawing Sheets

(51) Int. Cl.
  *G06F 9/445* (2018.01)
  *G06F 16/957* (2019.01)
  *G06F 40/14* (2020.01)
  *G06F 40/151* (2020.01)

(52) U.S. Cl.
  CPC ........ *G06F 9/44521* (2013.01); *G06F 16/957* (2019.01); *G06F 40/14* (2020.01); *G06F 40/151* (2020.01)

(56) References Cited

U.S. PATENT DOCUMENTS

| | | | |
|---|---|---|---|
| 2010/0114864 A1* | 5/2010 | Agam | G06F 16/951 707/706 |
| 2014/0006930 A1* | 1/2014 | Hollis | G06Q 50/01 715/234 |
| 2018/0165364 A1* | 6/2018 | Mehta | G06F 9/54 |
| 2019/0034531 A1* | 1/2019 | Bosarge | G06F 3/017 |

* cited by examiner

DYNAMIC CONFIGURABILITY OF WEB PAGES

CROSS-REFERENCE TO RELATED APPLICATIONS

This application is a claims priority and benefit of U.S. Provisional Application No. 63/089,495, filed Oct. 8, 2020, titled DYNAMIC GENERAL CONFIGURABILITY OF WEB PAGES TO OPTIMIZE CONTENT FOR SEARCH PERFORMANCE AND USER EXPERIENCES, which is incorporated herein by reference in its entirety.

FIELD

The embodiments discussed herein are related to dynamic configurability of web pages.

BACKGROUND

Electronic content is more accessible now than ever before. Most people carry devices that allow them to access electronic content anytime and anyplace. Many times people access the content through a search for the specific content using a search tool on the internet. The search tool displays links to the content and allows a user to select particular content for viewing.

The subject matter claimed herein is not limited to embodiments that solve any disadvantages or that operate only in environments such as those described above. Rather, this background is only provided to illustrate one example technology area where some embodiments described herein may be practiced.

SUMMARY

A method including accessing a website including one or more webpages. The method may also include determining, by a processor, one or more modifications to the one or more webpages of the website configured to improve a search engine optimization (SEO) of the website. The method may also include determining, by a processor, software code configured to enact the one or more modifications. The method may also include determining, by the processor, group-specific instructions configured to insert the software code into the one or more webpages of the website via attribute overwriting. The method may also include installing the group-specific instructions into an application stack of the website so that device browsers executing code of the website, to render the one or more webpages, execute the software code.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
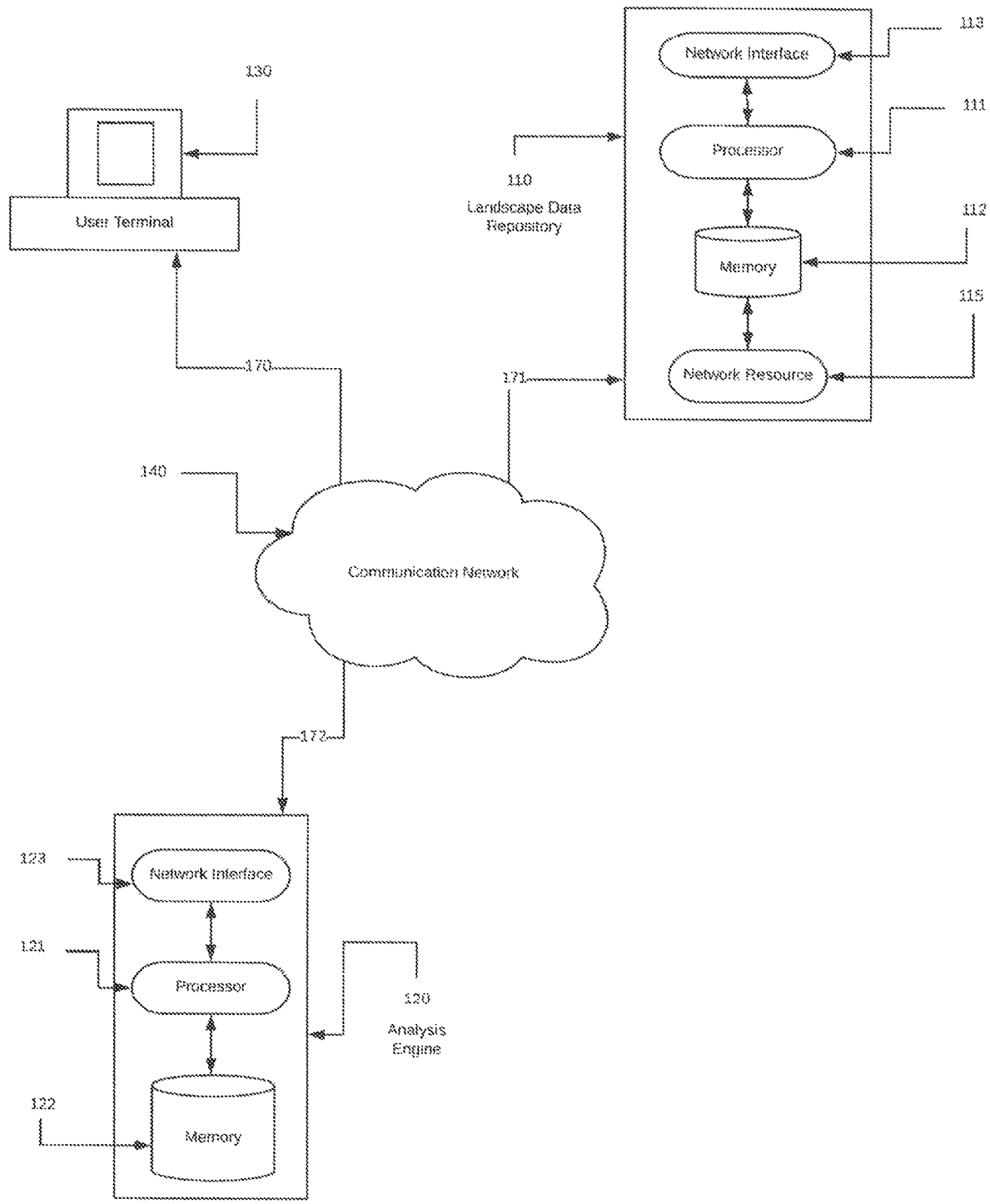
FIG. 1. is an example environment for modifying web pages.

The disclosed embodiments relate generally to the inclusion and distribution of content and the display of content on electronic devices accessed by end-users via the Internet. In particular, the disclosed embodiments relate to systems and methods for modifying the computer code used for building and serving a web page and the steps and sequence of steps involved in configuring web page components as well as the interaction and technical interfaces between websites, content delivery network ("CDN"), and end-user electronic devices to deliver and display content. More specifically, this disclosure not only relates to modifying a web page to include a precalculated set of links within the web page and anchor text but also how content that can be optimized for world wide web search ("external search") queries and internal website search ("internal search") queries to increase traffic to websites and webpages and to enhance and modify the content on webpages in ways that improve the user experience in terms of page load times, content relevance, and conversion rates.

Further, the disclosed embodiments also relate generally to how pages and page components can be optimized using pre-calculated methods that may involve pre-processing as well as dynamic methods, both of which can be used in a variety of ways to reduce the time it takes to implement and deploy modifications to a web page. Furthermore, these embodiments can involve a variety of combinations of end-user devices, websites, CDNs and software code that facilitated interfaces between these elements to more fully and quickly automate various aspects of how web page content and content components can be optimized, configured, distributed, and accessed by end-users on different types of end-user electronic devices.

There are important reasons why automating the optimization and delivery of content is valuable to organizations and enterprises (collectively "enterprises"). First, it is not uncommon today for organizational and technical processes necessary to optimize content and improve user experiences to be exceptionally complex and involve multiple stakeholders in a variety of different functional disciplines. Second, with respect to search engine optimization, how search engines crawl and rank webpages and websites change frequently. Indeed, it has been said that Google changes its algorithms and search parameters for crawling websites hundreds of times a year, making it very difficult for digital marketers to stay current with all the changes and also implement impactful modifications to their content in a timely manner, Similarly, how an enterprise's webpages and content rank in search depends in part on the content and offers from other websites and webpages that Google also crawls, which again is very difficult for digital marketers to know moment-to-moment and respond to in a timely manner. To the extent it is possible to automate some of the steps to identifying problems, specifying edits, and then implementing the valuable modifications, the benefits can be substantial. Automating some or all of the steps can help enterprises scale more quickly and efficiently and also with greater precision. With these considerations in mind, the disclosed embodiments herein also relate generally to automated systems that can reduce the amount of time & effort digital marketing teams, website managers, and IT departments need to optimize webpages, web page content, and web page components to get more traffic, deliver higher quality user experiences, and boost business results from digital marketing.

In addition, this disclosure also relates generally to how information about visitors to a webpage, such as demographic, psychographic, and audience profile information (called "user-specific information"), past browser behavior, prior purchase history, and the like as well as information about other competing web content, services provided by other digital channels, as well as seasonality and market trends can be applied and used in the optimization process further enhance and personalize webpage content that a visitor to a webpage experiences. Whereas search traffic, especially organic search traffic, may provide limited information about an individual visitor or classes and categories of visitors to and audiences for a web page, user-specific information from a variety of sources can be utilized in this framework to further optimize web content to make it more personalized and relevant. Greater personalization and higher relevance could yield greater customer satisfaction and higher conversion rates which are commonly principal objectives of the digital marketing strategy of a commercial enterprise. To display a variety of content including but not limited to different text content, image or video content, end-user "offers," "calls-to-action", page layouts, and the like for specific visitors, types or classes of visitors, target market customer profiles and types of audiences of such information.

In addition, this disclosure also relates generally to how embodiments for optimizing content, including but not limited to methods that automate aspects of the creation of optimized content, can be used by and integrated into A/B testing systems to test & evaluate the search and end-user performance of page content using designs, components and other "treatments" that vary from one implementation to another, both before and after deployment on a website.

Modern internet search engines are highly dependent on how the various web pages within websites are organized and arranged as well as how they perform in actual use by end-users (according to a variety of parameters), and in particular, how these web pages are optimized for search discoverability, relevance to user search intent, technical page elements (including but not limited to tags, internal and external backlinks, headers, formats, schema, etc.), internal and external search performance, page load times, bounce rates, geographic location, presence or absence of certain features such as a visitor privacy permission link or feature, and end-user device types. Each of these factors, in varying degrees across different websites for different companies in different industries and geographic markets individually and in combination, have an impact on the rank of the page when a user searches for a topic on the web, how end-users react to the page when they access it, and what end-users ultimately do when they access the web page. For example, all things being equal, if two pages have the same content, but one had more hyperlinks that is directing to it from other relevant pages, the page with the more hyperlinks directing to it from other pages would be ranked ahead of the page with fewer hyperlinks. Further, an important method for how search engines discover new and updated pages to be added and indexed for different search terms is to evaluate a first page, and then move on to the next set of pages that are hyperlinked to the first page, appraising the relevancy and authority of each page as an indexing program navigates through the hyperlinks. Indexing programs typically rely on an enormous set of computers to fetch, or "crawl" the billions of pages that exist on the web. They rely on an algorithmic process to determine which sites to crawl, how often, and how many hyperlinks to follow in a particular path. Similarly, how long it takes to load a page can influence the search rank of a webpage. And in turn, page load times can influence what end-users do when they try to access a page. For example, if a page takes too long to load, an end-user may decide to leave the page, for which there is a metric called "bounce rate" that can be a critical factor for how search engines analyze webpages. All other things being equal, pages that have longer load times tend to have higher bounce rates. Long page load times are associated with lower end-user satisfaction and higher bounce rates, which are associated with poor user experiences and lower conversion rates. Page load times is a particularly important issue when it involves a mobile device. Mobile device users typically are thought to be especially sensitive to page load times, particularly as compared to desktop system users. For one, mobile devices may more often access the web on slower networks than desktop systems in offices and homes wired with high-speed broadband. Secondly, mobile users may more often be in transit mode or accessing content between other activities. In such circumstances, longer page load time could be seen as especially annoying and result in lower end-user satisfaction, a less compelling user experience, less time spent on a webpage and in a website, and consequently lower conversion rates for a range of conversion events, including but not limited to "calls to action", "offers", and purchase rates or average order sizes for orders placed for products and services. Third, mobile users have a higher propensity for wanting "quick answers" and getting responses to voice queries, navigation, or conversational situations and applications, and in this case long page load times by their nature are an obstacle to delivering mobile end users what they want when they want it. Furthermore, search engines often evaluate webpage page load times, and the page load times they measure influence how they rank a page, with longer load times associated with lower page rank and, consequently for a website owner, lower visitor traffic and conversion events attributable to search engine queries, for both organic search as well as paid search visitors.

The crawl process used by a typical web-indexing program can begin with a list of webpage URLs, typically generated from previous crawls, and typically with the help of a sitemap provided by the crawled website. As the website is crawled by the indexing program, the indexing program is configured to detect links (e.g., SRC and FIREF attribute and anchor tag) within the crawled page, and then adds them to its list of pages to crawl. In this way, the indexing program can account for new sites, changes to existing sites, and dead links, all of which can be used to update the index and rank pages according to the number of hyperlinks directing to it. Similarly, as mentioned above, other page and content characteristics are analyzed by search engine crawlers. Page load times is just one of such characteristics.

If a website owner wants the website and its webpages to achieve a high rank in a search engine query for a given search (called search engine optimization, or SEO), each page element analyzed within a website and the content of its webpages should be optimized for search. In the case of backlinks, such backlinks should be as relevant as possible, and should map to appropriate web searches. In the case of page load times, each page should load as quickly and efficiently as possible. Images should have image tags. Page titles should conform to search engine guidelines regarding length and relevance to the content on the webpage. Indeed, multiple different elements that make up a webpage or that determine its appearance to an end user on a specific device are potential candidates for optimization.

Search engine optimization can be described as the process of affecting the online visibility of a website or a web page in a web search engine's unpaid results often referred to as natural, organic, or earned, results. In general, the earlier (or higher ranked on the search results page), and more frequently a website appears in the search results list, the more visitors it will receive from the search engine's users. For many websites, that kind of visibility is correlated with the ability of a website to attract new potential customers and ultimately earn money, whether from advertisements or online sales.

This is particularly true for eCommerce websites, which typically include significantly more pages than a personal website or a website that simply displays business information. For some eCommerce websites, the number of pages that make up the site can be in the millions because often those websites contain pages for categories of products and individual product listing pages.

How users respond to content on a webpage can be influenced by a number of factors, including on-page as well as off-page factors, as well as psychographic, demographic and behavioral characteristics of an end-user as well as social influences as reflected in social signal data associated with social media platforms including but not limited to Facebook, Twitter, Instagram, and Pinterest. On page factors could include many technical and contextual aspects of what appears on a page and how it is constructed, including but not limited to overall page appearance, individual components including text, images, video, specific offers or recommendations, specific calls-to-action, tags, titles, links, page load times, appearance on desktops vs mobile or tablet devices, presence or absence of a privacy policy or visitor privacy permission link or feature, etc. Besides the relevance of page content to end-user search intent (as for example revealed by keywords in a search engine query), several of these factors directly influence how a search engine may rank a page. Off-page factors could include how competitors are marketing similar content and offers to the same individual end-users or to classes and groups of users (called generally "target audiences") types of users. Furthermore, how a customer responds to content may also depend on what stage they are in what is sometimes called the "Customer Journey" (i.e., they may currently be "investigating" rather intending to buy something right away, sometimes described as top-of-funnel vs bottom-of-funnel). In addition, how a customer might respond to page content could also be calculated and predicted with some level of confidence based on what other content they may have been exposed to in the past and their responses to that content, what other offers they have accepted (for example, prior purchases), or who may exhibit specific behavior patterns that relate to other customers to a website or who a website owner has categorized into various customer "segments" for marketing purposes.

The impact that website page content has on the overall performance of a website, furthermore, depends not only on the structure of a site, but also the relative impact that individual pages have on the site's performance and the performance. Indeed, it may often be the case that, certain pages or a subset of all pages account for a majority of web traffic to a site. A website manager. therefore, may want to prioritize specific target webpages or subsets or groupings of webpages for optimization.

Modifying a website to improve SEO may involve editing its HTML and associated coding to increase both the website's relevance and discoverability. Efforts to improve SEO may also entail removing barriers to the indexing and ranking activities of various search engines. As discussed above, this modification can include linking pages within a website to other pages within a website that are found to share relevant content across the pages and to provide signals of relevance and authority about a particular topic. The sheer size of such websites, however, creates problems for programs, bots, crawlers, and the like, designed to map the web for searching by consumers.

A well-designed, well-architected, website will employ various schemes for SEO. A poorly-architected website, on the other hand, will suffer because it is not optimized for search-engine relevancy, and in many cases, can be penalized in ranking by violating various rules used to rank web pages (i.e., overuse of specific keyword—keyword stuffing; too many irrelevant links—link spam, lack of substance in subject matter—thin content, etc.). These problems can happen at the outset, as a website is built and launched. More often than not, however, the violations happen over time as websites are expanded to fulfill a business's changing needs because many SEO factors may not always or consistently be taken into account in that expansion process for each iteration of a webpage over time.

One of the most important and most challenging part of any search optimization effort is the relevant internal linking of web pages within a web site. The challenges include both identifying and ranking appropriate internal links and modifying the web page to include the links in a way that helps to improve a web page's SEO. To help to improve SEO, when developing an appropriate network of links among the web pages of any domain, the links should account for at least some of the following issues: be contextually relevant, improve user experience, reduce bounce rate, increase engagement, possess value-adding anchor text, use diversified anchor text across pages, support both offensive and defensive SEO strategies (for example offensive SEO strategies helps to increase SEO and defensive SEO strategies assist in maintaining SEO), help optimize "crawl budget", support improved placement in the search engine results page ("SERP") rank and growth of keyword footprint, adapt to different sections on a domain, and help to improve revenue and conversion rates.

Achieving even a few of the above goals is challenging, especially at scale. Thus, a need exists for a system to quickly and efficiently modify web pages to include optimized content for search engine performance and targeted end-user offers, calls to action, and other content to enhance and improve end-user experiences, website conversion rates, increase the number and average value of purchases and more effectively and efficiently integrate and interface with other digital channels to improve their performance using search metrics and optimized content.

Embodiments described in this disclosure generally relate to systems and methods for modifying the computer code used for building and serving a web page and various webpage components that comprise a webpage. More specifically, this disclosure relates to modifying a web page to include optimized content and a variety of page components, including links, images, video, offers, personalized content within the web page in a way that increases the likelihood of boosting the ranking of the web site in external search engine results, directing customers from internal search engines to webpages, or otherwise impacting end-user experiences for visitors to a website's content.

In one embodiment, a method includes receiving, at a processor, a request for a first web page within a website, and sending, from the processor, a request for a modification to the first web page, the modification including at least one link associated with a second web page. The requested link is received by the processor, which then modifies the first web page by incorporating the link into the first web page and then serving the modified first web page.

In another embodiment, a method includes receiving, at a processor, a set of content and strategy data for a first page on a website and determining a link to at least a second web page on the website, the link being relevant to both the first and second web page, and where the determining is based on, at least in part, the contents of the set of content and strategy data. The link is then configured to be included in a link block that is associated with the structure of the first web page, and that is configured to be installed in the first web page. Finally, the link block is sent over the network to be included in a served and/or displayed web page.

In another embodiment, a method comprises determining, by a processor, a set of relevant keywords for a first web page. Then the processor determines a set of links that include keywords in common with the first web page. Once the set of links is determined, and includes at least one link, it is sorted to create a subset of links found to be relevant to the first web page. Appropriate anchor text for member or members of the subset of links is determined and configured for inclusion into the first web page. Once the anchor text is configured for inclusion into the first web page, it is sent to the first web page for inclusion in the first web page.

In another embodiment, a method comprises determining, by a processor, target pages or subsets or groupings of webpages on a website to prioritize for optimization. The prioritization may consider a number of factors, including but not limited to the keywords, a type or number of keywords used for the website or for webpages, the keyword taxonomy associated with a website or a webpage, the search "authority" of a website or a webpage, the difficulty of modifying content on a webpage, the internal link structure of a web site, the likelihood or difficulty associated that certain modifications would have a material impacting on search results or the quality of a web experience for a visitor, various parameters regarding specific customers or audiences that an enterprise seeks to personalize or target content for, the search volume for keywords related to the content on a webpage, competing offers that customers may be exposed to or may have seen from alternative competing websites, the industry of the enterprise, the size of the business, the structure of the website, the load times of webpages, the characteristics of electronic devices end-users use to access the website, presence or absence of a privacy policy or visitor privacy permission link or feature, the difficulty of optimizing individual components that comprise a webpage, etc.

In another embodiment, a method comprises determining, by a processor, what instructions to include in a software development kit ("SDK") that allows the insertion of software code (a "widget") into webpages on a website. Furthermore, such instructions could optionally determine where to insert the widget in the sequence of code that defines a webpage and that informs a browser as to where to get/access various components that may comprise a webpage (e.g. the hypertext markup language "HTML" code, for instance). It might be more advantageous, for example, for such a widget to be inserted in the header or sub-header of the HTML code rather than in the tail of the HTML.

In another embodiment, a method comprises determining, by a processor, what specific software code or browser instructions to inject into a webpage.

In another embodiment, a method comprises determining, by a processor, what an end-user electronic device should do next to get or access webpage components. Such instructions could, optionally (a) direct the browser to a specific uniform resource locator "URL" or destination on the webpage or elsewhere on the website or to a content delivery network "CDN" (that may be internal or external to the website) to fetch one or more optimized components; or (b) direct the browser to a URL or destination to get additional information that then, subsequently, directs the device to access or get webpage components somewhere else; or (c) go to a "Smart CDN" that is configured to detect and act on information about the type of browser or the visitor to determine what optimized webpage component to deliver and where to get it; or (d) some combination of the above.

In another embodiment, a method comprises a way, by a processor, to determine the type of electronic device that may be accessing a webpage and, optionally, determine whether such device is be suitable for presenting an optimized version of certain webpage elements to such device. Such information about the electronic device could be used by this module or passed on to another module to determine what content is most appropriate for or compatible with that device. For example, if it is an Android mobile device, a WEBP image may be most appropriate whereas for a Safari mobile device a JPEG image may be more appropriate. By way of extension, the characteristics are not limited to Android vs Safari and WEBP vs JPEG, but it could be for any type of content or data format, text, image, video, etc. Furthermore, if it can be determined that the human interface is a touch screen or a voice query, different types or different formats of content or data might be more appropriate than others.

In another embodiment, a method comprises determining, by a processor, whether a webpage element being accessed by a visitor has already been previously optimized and available for distribution, and optionally, either in a first or a subsequent instance optimize the webpage element to distribute and/or cache the element or fetching a version of that webpage element that was previously saved.

In another embodiment, a method comprises a way to store, by a processor or set of processors, optimized webpage elements in a distributed system to facilitate access to a variety of content and webpage elements intended for building webpages on a given website or for multiple different websites, such distributed system for storage and access of webpage components, furthermore, could be managed and controlled optionally outside or inside the website and, furthermore shared across different websites.

In another embodiment, a method comprises a way to determine, by a processor, a variety of personalized content, marketing offers, and end-user experiences targeting specific end-users, groups, target audiences or user profiles, etc. Such embodiment could, optionally, incorporate a wide range of data to determine what elements for personalization, including but not limited to customer relationship management "CRM" data about visitors, marketing automation data about visitor, past purchase history of visitors, prior content the customer has been exposed to either on that webpage or website or other websites, seasonality factors, geographic factors, device characteristics, information about any voice interface being used by visitors, credit histories of visitors, and other demographic and psychographic information about visitors, as well as predictive behavioral information and modeling about visitors and information about pricing, inventories, presence or absence of a privacy policy or visitor privacy permission link or feature, and other business or product & services information related to the enterprise and offers that might be available. Such embodiment could include data from an enterprise's 1st party Customer Data Platform ("CDP") or Customer Relationship Management ("CRM") platform, its first party web analytics platform, it's ecommerce platform, its CRM system, etc.

This application incorporates by reference U.S. Pat. No. 9,959,256 in its entirety. One or more of the systems and methods described herein describe a way of modifying a first web page to include links to other web pages that are found to be relevant to the first web page. As used in this specification, the singular forms "a" "an" and "the include plural referents unless the context clearly dictates otherwise. Thus, for example, the term "a computer server" or "server" is intended to mean a single computer server or a combination of computer servers. Likewise, "a processor" is intended to mean one or more processors, or a combination thereof. One skilled in the art will also understand that a web page is a document on the Internet, and that a website comprises one or more web pages that are linked together.

FIG. 1 is a block diagram of a system for modifying a first web page to include a link or URL referring to a second web page (or a plurality of links or URLs, each referring to a different web page), and serving or displaying the modified first web page. The first web page is modified to include links intended to improve SEO, improve user experience, and reduce impact on any lag experienced by an end user when requesting the first page.

As illustrated in FIG. 1, in an embodiment, user terminal 130 sends through communication network 140, via network connection 170, a request for a web page. Website publishing system 110 receives the request via network connection 171, but instead of simply serving the web page, in an embodiment, website publishing system 110 communicates either directly or indirectly with link prepublishing system 120 through communication network 140 and network connections 171 and 172 and requests a set of links that have been determined by link prepublishing system 120 to meet predetermined relevance criteria. The term website publishing system as used in this document is a computer-based system connected to a network and includes the functionality of both receiving a request for a first web page and serving the first web page.

The set of links, as described in this document, includes at least one link (or in an embodiment, a plurality of links) that, when clicked on, will access a second web page (or other web pages, respectively). In an embodiment, the set of links, when included in the first web page, will improve SEO for that web page. For the purposes of this document, the term link, also known as a hyperlink, is used to mean a reference to data that a website user can directly follow either by clicking, tapping, or hovering; acting on the link in such a way (or a similar way) that allows for navigation directly to a target URL. A link points to an entire document or to a specific element within a document.

Network connections 170, 171, and 172 can be any appropriate network connection for operatively coupling user terminal 130, website publishing system 110, and link prepublishing system 120 to communication network 140.

In one embodiment, in response to the request received from website publishing system 110, link prepublishing system 120 sends the set of links back through communication network 140 to be received by website publishing system 110. In an embodiment, the set of links are encapsulated in a link block that is configured to be incorporated into the first web page. Once website publishing system 110 receives the rule library, the requested web page can be modified based on the received set of links, and then served to user terminal 130. In an embodiment, the requested web page is modified by changing the computer code on which the requested web page is based.

Communication network 140 can be any communications network configurable to allow website publishing system 110, user terminal 130, and link prepublishing system 120, to communicate with communication network 140 and/or to each other through communication network 140. Communication network 140 can be any network or combination of networks capable of transmitting information (e.g., data and/or signals) and include, for example, a telephone network, an Ethernet network, a fiber-optic network, a wireless network, and/or a cellular network. In some embodiments, communication network 140 can include multiple networks operatively coupled one to another by, for example, network bridges, routers, switches and/or gateways. For example, user terminal 130 can be operatively coupled to a cellular network, link prepublishing system 120 can be operatively coupled to an Ethernet network, and website publishing system 110 can be operatively coupled to a fiber-optic network. The cellular network, Ethernet network and fiber optic network can each be operatively coupled one to another via one or more network bridges, routers, switches and/or gateways such that the cellular network, the Ethernet network and the fiber-optic network are operatively coupled to form a communication network. Alternatively, for example, the cellular network, the Ethernet network, and the fiber-optic network can each be operatively coupled to the Internet such that the cellular network, the Ethernet network, the fiber-optic network and the Internet are operatively coupled to form a communication network.

In some embodiments, a network connection can be a wireless network connection such as, for example, a wireless fidelity ("Wi-Fi') or wireless local area network ("WLAN") connection, a wireless wide area network ("WWAN') connection, and/or a cellular connection. In some embodiments, a network connection can be a cable connection such as, for example, an Ethernet connection, a digital subscription line ("DSL) connection, a broadband coaxial connection, and/or a fiber-optic connection. In some embodiments, a user terminal, partner application and/or website publishing system can be operatively coupled to a communication network by heterogeneous network connections. For example, a user terminal can be operatively coupled to the communication network by a WWAN network connection, a partner application can be operatively coupled to the communication network by a DSL network connection, and a website publishing system can be operatively coupled to the communication network by a fiber optic network connection.

In an embodiment, once a web page is modified by website publishing system 110, the modified web page is cached in content delivery network ("CDN") 107. For the purposes of embodiments of the invention, CDN 107 can be a CDN owned or controlled by website publishing system 110, or can be a third-party CDN, or can be any known commercial CDN, or can be a CDN associated with link prepublishing system 120, or any combination of possible CDNs.

In an embodiment, link prepublishing system 120 can create a set of links by receiving a set of content and strategy data from website publishing system 110, via network interface 113, storing the received data in memory 122, and processing the set of content and strategy data at processor 121 to create an appropriate set of links to be included in the first website. In an embodiment, content and strategy data can include a web page's meta data, which can include, for example (but not limited to) the web page's URL, keywords gathered from search engines about the web page, and the search volume of those keywords. In an embodiment, the most common search queries are identified for all (or a defined subset) of pages within a website that bring traffic to those pages. When two (or more) pages rank above a predefined threshold, the content within those pages are deemed relevant to the other pages in the website (or defined subset).

In an embodiment, content and strategy data can include visitor behavior analytics. For example, when a user navigates to a first web page, the most common next and subsequent web pages to which users navigate can be identified as relevant to the first web page. In an embodiment, web pages to which a user navigates prior to navigating to the first web page can be identified as relevant. Also, for example, when a user navigates to a first web page, a common subsequent web pages to which users in certain customer profiles navigate may be identified as relevant for visitors to the first web page.

In an embodiment, content and strategy data can include natural language processing such that known natural language processing algorithms are used to scan the content of pages to understand the subject matter, and to create a list of keywords that the page is about. In an embodiment, content and strategy data can include the content within the page itself, which can include, for example (but not limited to), the title of the web page, the summary description, and the body content.

Alternatively, link prepublishing system 120 can create a set of links based on content and strategy data that has been determined within link prepublishing system 120 on processor 121. Once the set of links is created, it can be stored in memory 122 for access by website publishing system when the relevant web page is requested, or to be sent to website publishing system at a predetermined time. Network interface 113 can be any network interface configurable to be operatively coupled to communication network 140 via network connection 172. For example, a network interface can be a wireless interface such as, for example, a worldwide interoperability for microwave access ("WiMAX) interface, a high-speed packet access ("HSPA") interface, and/or a WLAN interface. A network interface can also be, for example, an Ethernet interface, a broadband interface, a fiber-optic interface, and/or a telephony interface.

In one embodiment, web site publishing system 110 sends a request for a set of links through communication network 140 to CDN 107. Upon receiving the request, CDN 107 sends the set of links to website publishing system 110 via communication network 140 to create a modified first web page by incorporating the set of links, or a subset of the links, into the first web page, prior to serving the modified first web page to user terminal 130.

In an embodiment, the website publishing system can be based in any combination of hardware and software. In an embodiment, web site publishing system 110 includes network interface 113, processor 111, memory 112, and network resource 115. Website publishing system 110 is operatively coupled to communication network 140 via network interface 113 and network connection 171. Network interface 113 can be any network interface configurable to be operatively coupled to communication network 140 via network connection 171. For example, a network interface can be a wireless interface such as, for example, a worldwide interoperability for microwave access ("WiMAX) interface, a high-speed packet access ("HSPA") interface, and/or a WLAN interface. A network interface can also be, for example, an Ethernet interface, a broadband interface, a fiber-optic interface, and/or a telephony interface.

Processor 111 is operatively coupled to network interface 113 such that processor 111 can be configured to be in communication with communication network 140 via network interface 113. In an embodiment, processor 111 (and processor 121) can be any of a variety and combination of processors and can be distributed among various types and pieces of hardware, or even across a network. Such processors can be implemented, for example, as hardware modules such as embedded microprocessors, microprocessors as part of a computer system, Application Specific Integrated Circuits (ASICs'), and Programmable Logic Devices ("PLDs). Some such processors can have multiple instruction executing units or cores. Such processors can also be implemented as one or more software modules in programming languages as Java™, C++, C, assembly, a hardware description language, or any other Suitable programming language. A processor according to some embodiments includes media and computer code (also can be referred to as code) specially designed and constructed for the specific purpose or purposes.

Processor 111 is also operatively coupled to memory 112 which, in an embodiment, can be used to store web pages, a set of content and strategy data, and/or webpage modifications. In an embodiment, memory 112 (and memory 122) can be a read-only memory ("ROM'); a random-access memory (RAM) such as, for example, a magnetic disk drive, and/or solid-state RAM such as static RAM ("SRAM) or dynamic RAM ("DRAM), and/or FLASH memory or a solid-data disk ("SSD), or a magnetic, or any know type of memory. In some embodiments, a memory can be a combination of memories. For example, a memory can include a DRAM cache coupled to a magnetic disk drive and an SSD.

In addition to memories 112 and 122, some embodiments include another processor-readable medium (not shown in FIG. 1) having instructions or computer code thereon for performing various processor-implemented operations. Examples of processor-readable media include, but are not limited to: magnetic storage media Such as hard disks, floppy disks, and magnetic tape; optical storage media Such as Compact Disc/Digital Video Discs ("CD/DVDs), Compact Disc-Read Only Memories ("CD-ROMs), and holographic devices: magneto-optical storage media such as floptical disks; Solid state memory such as SSDs and FLASH memory; and ROM and RAM devices. Examples of computer code include, but are not limited to, micro-code or micro-instructions, machine instructions (such as produced by a compiler), and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

In some embodiments, a website publishing system can be a virtual device implemented in Software such as, for example, a virtual machine executing on or in a processor. For example, a website publishing system can be a software module executing in a virtual machine environment such as, for example, a Java™ module executing in a Java™ Virtual Machine ("JVM), or an operating system executing in a VMware™ virtual machine. In some such embodiments, a network interface, a processor, and a memory can be virtualized and implemented in Software executing in, or as part of, a virtual machine.

As illustrated in FIG. 1, website publishing system 110 includes network resource 115. Network resource 115 can be, for example, a web server and/or database accessible over communication network 140. Network resource 115 can, for example, send a web page or other data formatted in hypertext markup language ("HTML") or other languages to user terminal 130, which user terminal 130 can display to a user.

In some embodiments, a network resource can include a database configured to process database queries received by a website publishing system over a communication network. In some embodiments, a network resource can exchange encoded binary data, such as images, videos, and/or documents, for example, with a user terminal over a communication network.

Similar to website publishing system 110, in an embodiment, link prepublishing system 120 can include processor 121, memory 122, and network resource 123, and is operatively coupled to communication network 140 through network connection 172.

Similar to website publishing system 110, but not shown in FIG. 1, user terminal 130 includes a network interface, a processor and a memory, and is operatively coupled to communication network 140 through network connection 170. In some embodiments, a partner application can include one or more software modules as part of a computer server operatively coupled to a communication network.

In an embodiment, link prepublishing system 120 can include, for example, a web server and/or database accessible over communication network 140, and is configured to, for example, send a web page or other data formatted in hypertext markup language ("HTML") or other languages to user terminal 130, or to another element in communication with communication network 140, such as website publishing system 110 for inclusion into the first web page, CDN 107 for caching, and/or user terminal 130 for displaying to a user.

In some embodiments, a network resource can include a database configured to process database queries received by a website publishing system over a communication network. In some embodiments, a network resource can exchange encoded binary data, such as images, videos, and/or documents, for example, with a user terminal over a communication network.

Figure 2:
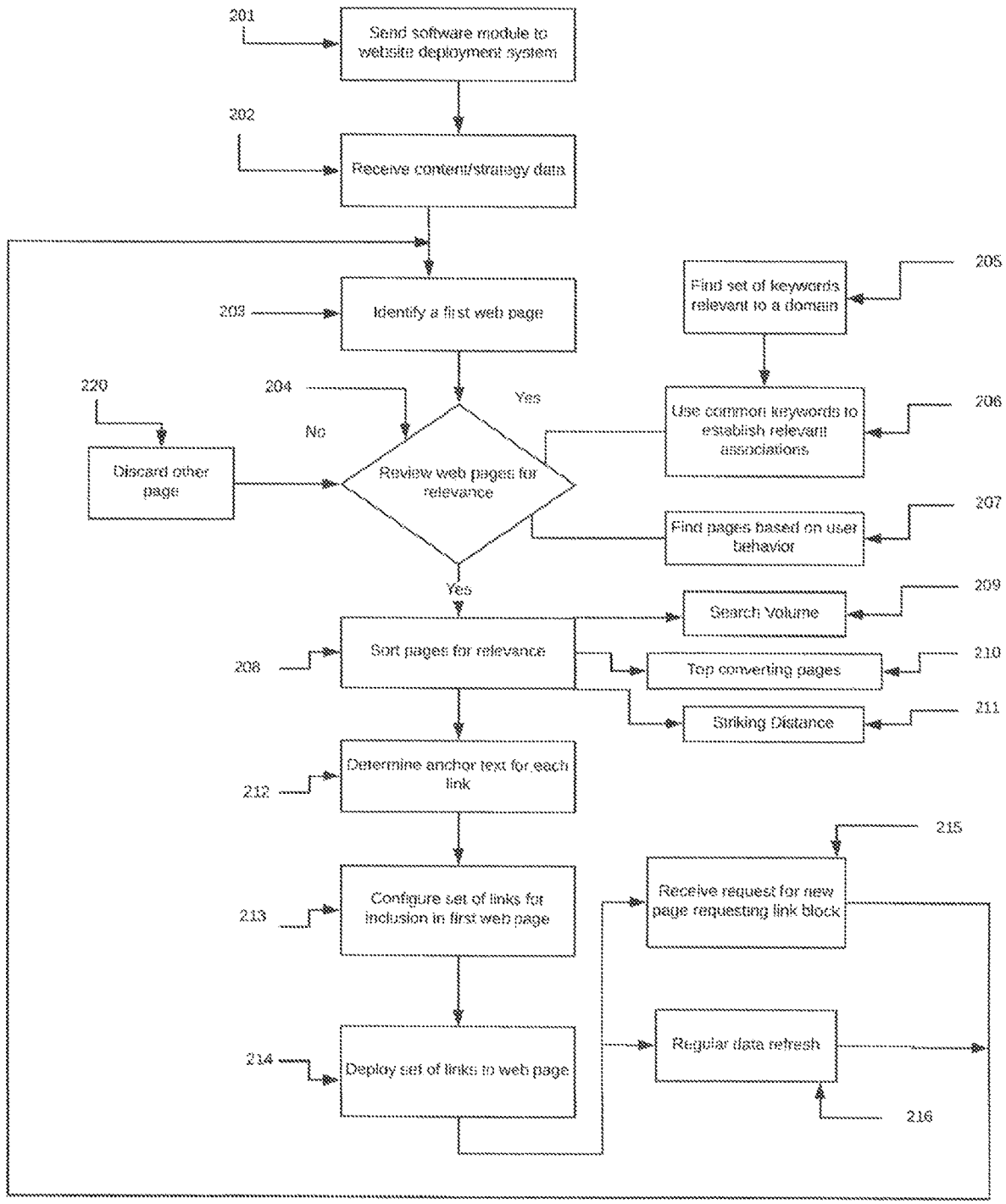
FIG. 2 is a flow chart of a process for modifying web pages by a link prepublishing system.

FIG. 2 is a flow chart of a process for modifying a first web page to be served by a website publishing system, according to an embodiment. A software module is sent from a link prepublishing system to a website publishing system, at 201. The software module can be an SDK, or some other computer program configured, when installed, to analyze a web page or group of web pages, and to send and receive data related to web page or pages, over a network, to and from a SaaS service, or other Internet-related service, including a link publishing system. In an embodiment, the data sent to the link publishing system includes a set of content and strategy data, at 202. In an embodiment, the content and strategy data include a set of parameters that can be used to determine an appropriate set of links for inclusion into the first web page, the set of links referring to at least a second web page.

For the purposes of the present invention, the term computer program includes software, firmware, middleware, and any code in any computer language in any configuration, including any set of instructions or data intended for, and ultimately understandable by, a computing device.

At 203, a first web page is identified. In an embodiment, the first web page is identified by receiving web page data from a web server system. In another embodiment, the first web page is identified by receiving web page data from a user terminal. In another embodiment, the first web page is identified by receiving a request to update the first web page. In yet another embodiment, the first web page is identified by the link prepublishing system according to predetermined criteria.

A predefined group of web pages, including at least a second web page, are analyzed in 204, and determined to be either relevant or not relevant to the first web page. The analysis at 204 can be performed in one or more of a number of known ways. In an embodiment, the analysis at 204 can include a keyword analysis that begins with determining a set of keywords relevant to the domain, at 205. In an embodiment, the relevant keywords include keywords used to search for the first web page and the second web page, the keywords to ultimately provide navigation to a web page. In an embodiment, relevant keywords can be determined by an organic performance analysis and can include an analysis of which keywords are typically used to find a web page. In an embodiment, the keywords, once found, are ranked for relevance. In an embodiment, the relevant keywords for multiple web pages may be found using a term-frequency analyses that consider a number of times that each term in a webpage is used. Alternately or additionally, the relevant keywords for multiple web pages may be found using an inverse-document-frequency analysis that measures whether a term is common or rate in a given web page or set of web pages.

Once the relevant keywords for the domain are determined at 205, keywords that are common among the web pages within the domain are analyzed to determine the relevant associations among the web pages, at 206. In an embodiment, the set of keywords found in 205 may not be limited to a single domain. Rather, the keywords and the relevant associations among pages can be analyzed and determined among pages from different domains.

In an embodiment, the analysis performed in 203 can be an analysis based on user behavior, at 207. In an embodiment, user behavior analysis includes analyzing the most common pages users navigate to or from the first web page. If a web page is determined to not be relevant, it is removed from further review at 220.

Once a set of relevant web pages is established, they are sorted for relevance at 208. Relevance sorting at 208 can be performed by analyzing a number of factors, either individually or in combination. in an embodiment, relevance sorting can be based on analyzing search volume, at 209, reviewing which keywords a page in the set of relevant web pages return ranks for. in an embodiment, relevance sorting can be performed by analyzing the search volume of the determined keywords.

In an embodiment, the set of web pages is sorted by analyzing the top converting page at 210. For example, conversion goals can be tracked by reviewing how often a page results in a goal defined by a customer. The goal can include, as examples only, whether a demonstration has been requested from the web page.

In an embodiment, the set of web pages is sorted by analyzing the top converting, page, at 210, For example, conversion goals can be tracked by reviewing how often a page results in a goal defined by a customer. The goal can include, as examples only, whether a demonstration has been requested from the web page.

In an embodiment, the set of web pages is sorted by analyzing the striking distance from the first (or other predetermined') position in search results for a given search query, 211. For the purposes of the present invention, the term striking distance means, for a given search query, a predetermined, and sufficiently close distance a search result is from the first (or other predetermined) position or first set of ranked results for a given search.

Each web page in the set of relevant web pages can be referred to by the URL, that points to each of the web pages in the set of web pages. At 212, the anchor text for each of the URLs in the set is determined. In an embodiment, anchor text can be any combination of at least a port of the headline (<hi> tag) for the target second page, the page title (<title> tag) for the second page, the social title (og:title) for the second page, the meta description for the second page, the social description (og:description) for the second page, the keyword or keywords that the second page ranks for, and the keyword or keywords that natural language processing algorithms identify as the topic keywords for the page. Once the anchor text for each URL in the set of web pages is determined, the information is configured in 213 to be sent to the website publishing system for incorporation into the website. For example, the set of web pages, including the anchor text information and/or their respective ETRIs can be packaged into a link block for sending to the website publishing system. For the purposes of this invention, a link block is HTML code that is configured to render on the webpage as a block of hyperlinks and associated anchor text in a way that appears to visitors as if it is part of the page it is embedded into. The link block, in turn. can be configured to satisfy any conditions found in a set of content and strategy data received in 202. In an embodiment, the link block is structured to fit into a module displayed on the first web page. At 214, the set of links are deployed or sent to the website publishing system for serving, or for caching to be served at a later time, possibly upon request from a user terminal. In an embodiment, the link block is preconfigured as a template. In an embodiment, the computer code underlying the link block can be customizable using MAIL CSS, JS Markup, or other types of computer code. In another embodiment, the link block data can be delivered server-side in JSON format.

In an embodiment, the link prepublishing system can update the set of links on a schedule appropriate to the domain for which content is to be published. To do this the link prepublishing system can use any combination of a destination URL manifest, data sources (including, but not limited to, a search-engine-results page, the content of the web pages themselves, web page or website analytics on how visitors navigate through the web pages) design templates, and algorithms, to generate the desired, page-specific link blocks or modules. In an embodiment, the link blocks or modules are then stored and made available to the webserver system or to a user terminal, or other requester. In an embodiment, a request for a link block is made via an API. In an embodiment, the API is accessed via a CDN that caches the data.

The process shown in 203 through 214 can be performed at an arbitrary time or can be performed as part of a regular data refresh. Since web pages are not completely static, the relevance of keywords, or of other web pages to the first web page, may change over time. Thus, the data can be refreshed at 216, rerunning at least a portion of the process found in FIG. 2. Links can be updated periodically, such as monthly, or at arbitrary times. Alternatively, the process can begin with, or be rerun with, a prompt from the website publishing system, such that a request for a link block for a new page is received at 215.

In an embodiment, a request for a link block can use https, and can be made from the software module to an API that allows the link prepublishing system to receive the request. In an embodiment, the software module is an SDK.

In an embodiment a link profile may be created for different sections, types, or groups of web pages within a website, allowing for the creation of a set of links for each profile. Profiles may include URL. whitelisting, blacklisting and a variety of other controls to ensure that the algorithmically selected links properly support the SEO strategy and desired user experience: of the pages in which links are placed.

In an embodiment, such link profiles may be grouped and prioritized to help ensure that available link placement slots on any given web page do not go to waste. For example, if the top-priority-profile only generates 60% of the desired links, the system will call on the next-priority profile to fill the remaining slots.

For the purposes of the present invention, 201 and 202 are shown at the top of the method in FIG. 2 for convenience only. In practice, 201 and 202 can occur at arbitrary times, based on, for example, whether the software module sent in 201 requires an update or upgrade, or whether the content and/or strategy contained in the set of content and strategy data has changed.

In an embodiment, the set of content and strategy data is input from a user at the website publishing system. In an embodiment, the set of content and strategy data is determined at least in part by the link prepublishing system based on predetermined factors.

Figure 3:
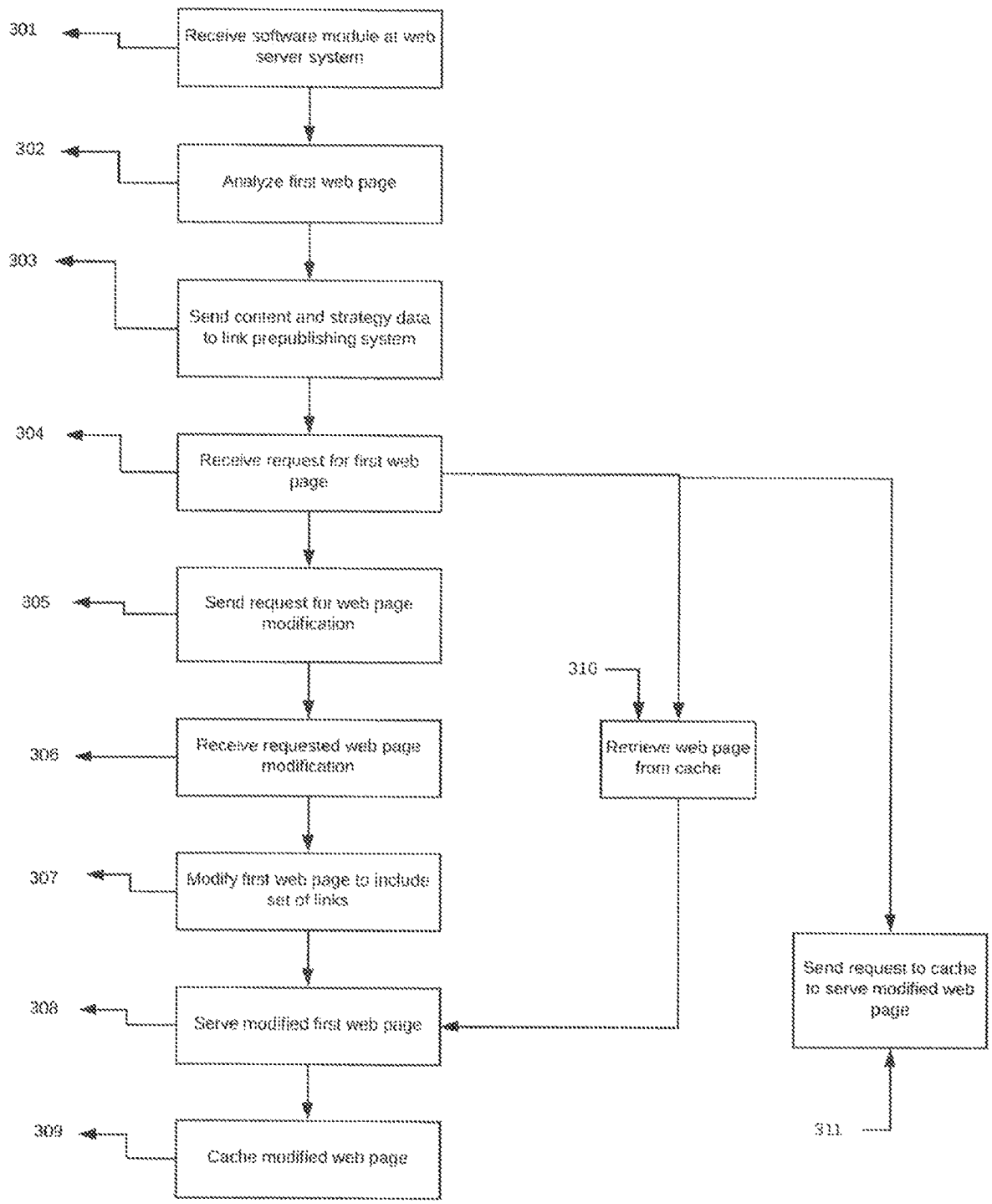
FIG. 3 is a flow chart of a process for modifying web pages to be served by a website publishing system.

FIG. 3 is a flow chart of a process for modifying a first web page to include a relevant links to other web pages, from the perspective of a web server system. A software module is received at a web server system, at 301. The software module is sent from, for example, a link prepublishing system. The software module can be an SDK, or some other computer program configured, when installed, to analyze a web page or group of web pages, and to send and receive data related to web page or pages, over a network, to and from a SaaS service, or other Internet-related service, including a link prepublishing system.

A first web page is analyzed, at 302. In an embodiment, the first web page is analyzed by a computer program that can be located at the web server system. The analysis can include an analysis of SEO issues related to the web page, such as keywords, links, related pages, the rank (or ranks) of the relevant web pages for the keyword, the search volume of the keyword, page elements such as (but not limited to) headlines, meta descriptions, and body content. In an embodiment, the first web page is analyzed by a computer program located across a communication network. In such an embodiment, the computer program can be a SaaS service, or other online service, that is configured to crawl or otherwise review the first web page to determine SEO-related issues. In an embodiment, the first web page is analyzed by a combination of network services along with a local computer program.

Content strategy data is sent to the link prepublishing system at 303. In an embodiment, content strategy data can be calculated and determined based on the analysis of the first web page, at 302. In an embodiment, set of content and strategy data can be manually input by a user, including a user of the web server system, or a user external to the web server system. In an embodiment, sending the set of content and strategy data at 303 is not sent from a web server system; rather, the set of content and strategy data is determined by the link prepublishing system.

At 304, the web server system receives a request for a first web page. In an embodiment, the request is generated by a user terminal. In another embodiment, the request is generated by a web-based service. In an embodiment, once the request for the first web page is received, the web server system sends a request for a web page modification, at 305. In an embodiment, the requested web page modification includes a set of links configured to be installed in the first web page to create a modified web page. At 306, the requested set of links is received. In an embodiment, the received set of links are encapsulated in a module configured to be installed into the first web page. In an embodiment, the set of links are included in computer code that, when installed, modifies the first web page to include anchor text that refers to web pages found by accessing the link.

The first web page is modified at 307. In an embodiment, the modification includes installing at least one link in the set of links received at 306, creating a modified web page. Once the first web page is modified, it is served at 308. In an embodiment, the web page is modified concurrent with being served. In an embodiment, the web page is served to the party that requested the web page.

At 309, the modified web page is cached. In an embodiment, the modified web page is cached at a CDN. In an embodiment, when the request for the first web page is received at 304, the modified web page is retrieved from the cache, at 310, and then served at 308. In an embodiment, the web server system sends a request to the cache to serve the modified web page, at 311.

Figure 4:
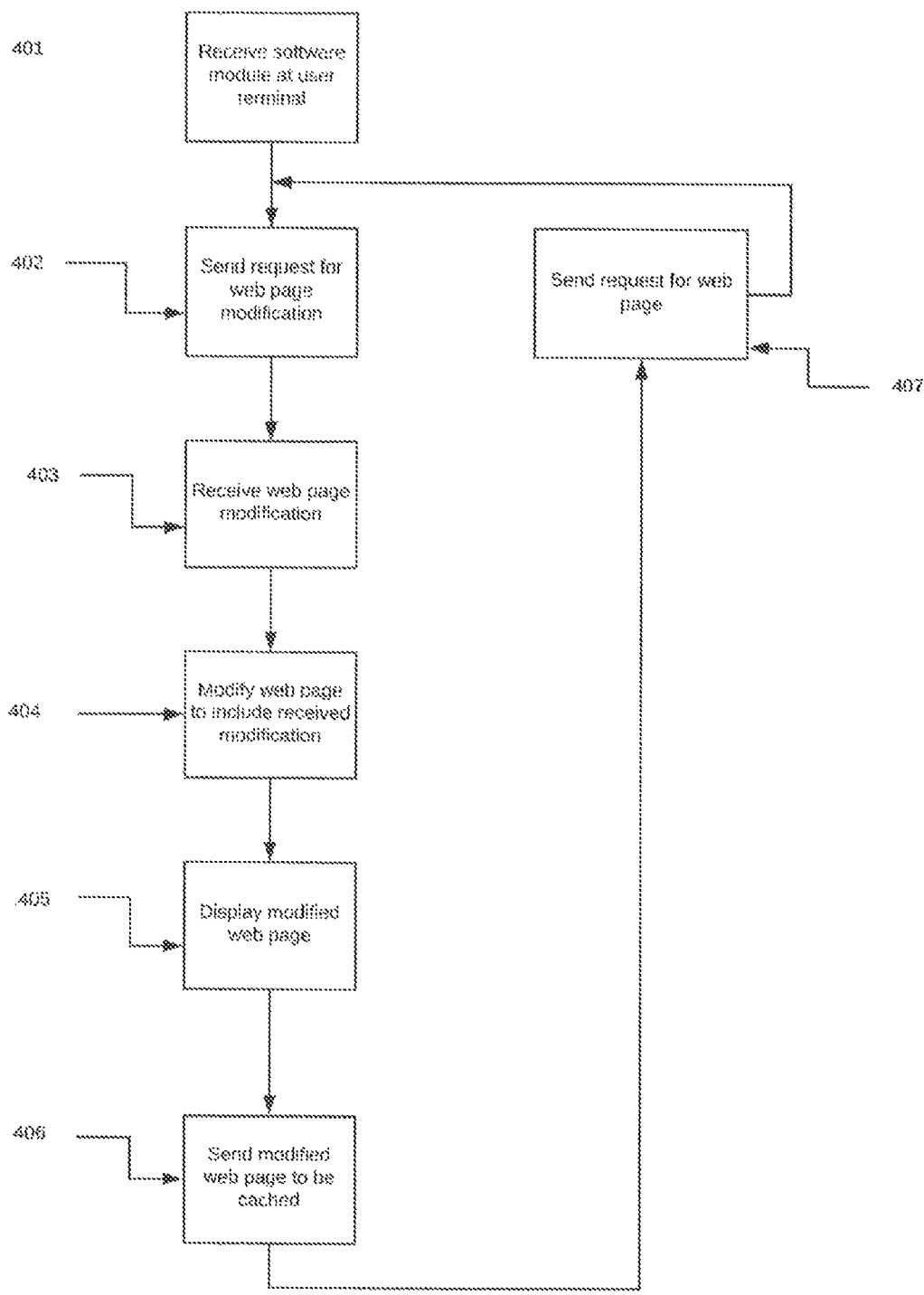
FIG. 4 is a flow chart of a process for modifying web pages to be displayed at a user terminal.

FIG. 4 is a flowchart of a process for modifying a web page for display on a user terminal. A software module is received at a user terminal, at 401. The software module is sent from, for example, a link prepublishing system. The software module can be an SDK, or some other computer program configured, when installed, to analyze a web page or group of web pages, and to send and receive data related to web page or pages, over a network, to and from a SaaS service, or other Internet-related service, including a link prepublishing system.

A request for a web page modification is sent at 402. In an embodiment, the request is sent to a link prepublishing system. At 403, the web page modification is received. In an embodiment, the received web page modification includes a set of links configured to be installed in a web page that a user desires to display on the user terminal. In an embodiment, the set of links is configured to be installed into the web page to create a modified web page. In an embodiment, the received set of links are encapsulated in a link frame configured to be installed into the first web page. In an embodiment, the set of links are included in computer code that, when installed, modifies the first web page to include anchor text that refers to web pages found by accessing the link.

The web page is modified using the received set of links, at 404. In an embodiment, the modification includes installing at least one link in the set of links received at 403, creating a modified web page. Once the first web page is modified, it is displayed at 405. In an embodiment, the web page is modified concurrent with being served. In an embodiment, the web page is served to the party that requested the web page. Once the web page is modified, the modified web page can then be sent to a cache. In an embodiment, at 406, the web page is sent directly to a cache such as, for example, a CDN. In an embodiment, the web page is sent indirectly to a cache, through, for example a web server system.

In an embodiment, a request is sent for a web page, at 407. In an embodiment, the request for the web page sent at 407 causes the user terminal to send the request for the web page modification.

Figure 5:
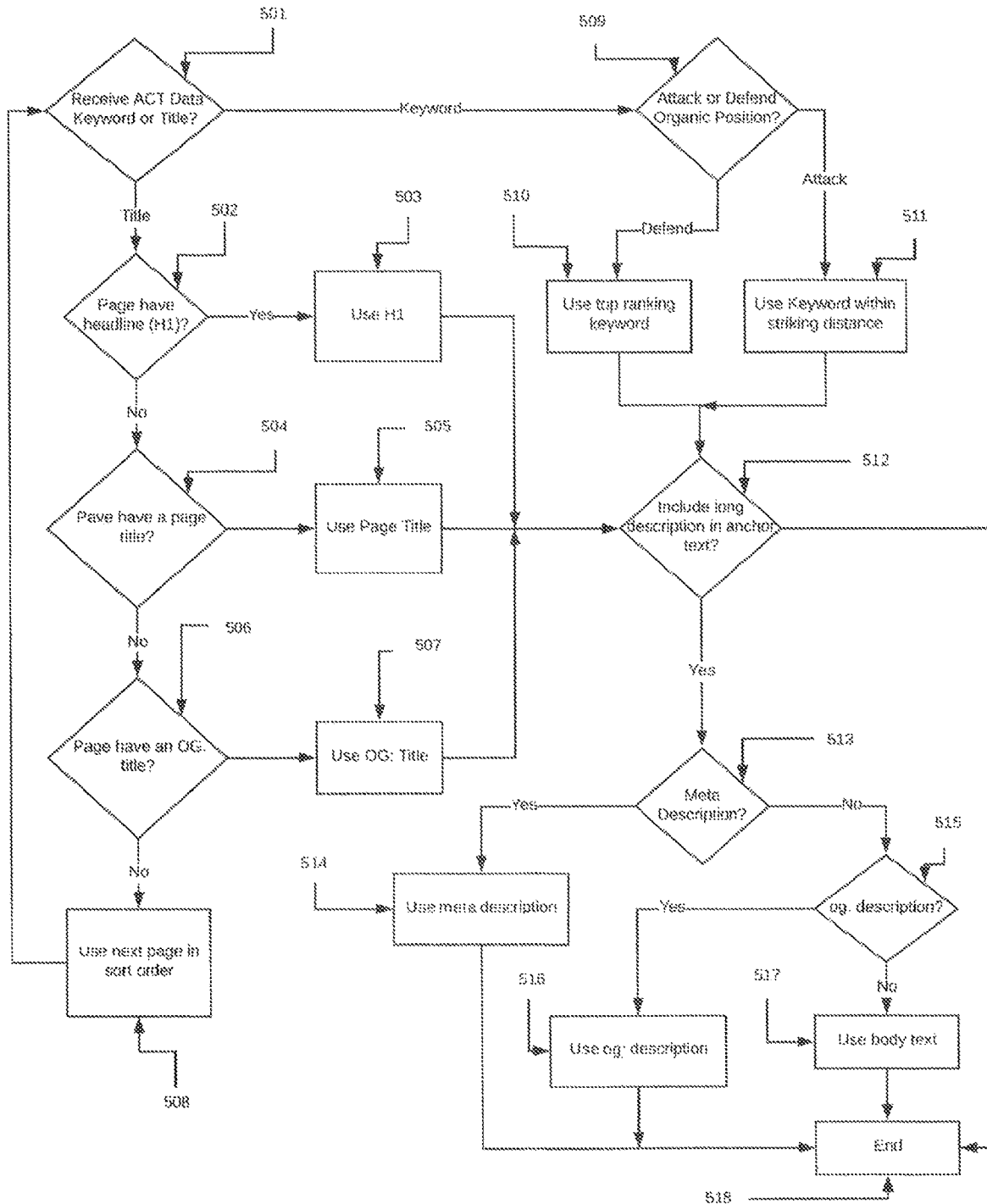
FIG. 5 is a flow chart of a process for determining anchor text.

FIG. 5 is a flow chart of a process for determining anchor text, according to an embodiment. In an embodiment, at 501, anchor text configuration (ATC) data is received at a processor and includes data for configuring the anchor text that links a first web page to a second, or target, web page. In an embodiment, anchor text configuration data can include data about a web page's SEO strategy, or about SEO preferences, or both, when determining which anchor text to deploy in the first web page. The data and preferences can include, for example, a choice of which factors, and in what order, to base the anchor text on, and can include at least some of the following factors: a preference to use either a title (or a portion of the title) of the second web page or a keyword or keywords associated with the second page, an <h1> tag, a <title> tag, an og:title, a long description, a meta description, an og:description, body text, an og:title, a long description, a meta description, an og:description, and SEO-improving variables such as user sessions, page views, conversions, ranked keywords, and any variable used by indexing programs.

For the purposes of the present invention, a long description can include a description, meta description, an og:description, or a string (or portion of a string) of characters from the body text of the second page. For the purposes of the present invention, a meta description includes a tag that is included in an html page that summarizes at least a portion of the contents of the page.

If a second web page's title is preferred over a keyword at 501, the processor then searches the code underlying the second web page to determine whether the second web page includes certain predetermined tags and metatags that can be used as anchor text. In an embodiment, at 502, the processor searches the code underlying the second web page to determine whether the second web page includes a header, or <h1>, tag. If yes, then at 503, the contents of the <hi> tag is used as anchor text. If no, at 504, the processor determines whether the second web page has a page title tag <title>. If the processor determines that the code underlying the second web page includes a <title> tag, then at 505, the contents of the <title> tag is used as anchor text. If not, at 506, the processor determines whether the second web page has an og:title metatag. If yes, then at 507, the contents of the og:title metatag is used as anchor text.

The order of determinations, above, beginning with the <hi> tag, then proceeding to the <title> tag, and then on to the og:title, are given by way of example only. In an embodiment, the order of determination of any chosen tag or meta tag can be changed, depending on a determination of the second web page's SEO needs. In other words, by way of example, in an embodiment, the processor can first determine whether the second web page includes a <title> tag, and if not, the processor can then determine if the second web page includes an <h1> tag.

In an embodiment, at 512, the processor analyzes the anchor text configuration data to determine whether to use all or a portion of a long description as anchor text. If using a long description is not preferred, then in an embodiment, at 518, the processor can insert the anchor text into a link block for a first web page to be used as a link to the second web page. If, however, the processor understands that using a long description is preferred, then at 513 the processor reviews the computer code for the second web page to see if the code includes a meta description. In an embodiment, if the processor determines that a meta description exists, then at 514, the meta description is used as anchor text. If the processor determines that no meta description exists, then in an embodiment, at 515, the processor determines whether the second web page has an og:description. If the second web page is found to have an og:description, then in an embodiment, the og:description is used as anchor text. If no og:description is found, the processor, at 518, configures body text into the link block for insertion into the first web page.

The order of determinations, above, beginning with the meta description, and then proceeding to the og:description, is given by way of example only. In an embodiment, the order of determination of any chosen tag or meta tag can be changed, depending on a determination of the second web page's SEO needs. In other words, by way of example, in an embodiment, the processor can first determine whether the second web page includes an og:description, and if not, the processor can then determine if the second web page includes a meta description.

In an embodiment, combinations of different tags and meta tags can be used to create anchor text. For example, the processor can determine if the second web page has both a <title> tag and an og:title, and use both, or portions of both, in creating anchor text. In another example, the processor can determine if the second web page has both a meta description and an og:description, and use both, or portions of both, in creating anchor text.

In an embodiment, at 501, if a second web page's keyword is preferred over a title at 501, then at 509, the processor determines preference as to whether to use create anchor text in a way the attacks or defends their organic position on a search-results page. In an embodiment, the preference to attack or defend is received in the ATC. In an embodiment, the data is received from a web page owner. In another embodiment, the data is received from a web server system. In another embodiment, the data is received from a system that calculates preferences based on predetermined parameters.

For the purposes of the present invention, attacking an organic position means employing a strategy that improves a web page's SEO by, for example, improving the web page's position on a search-results page. For the purposes of the present invention, defending an organic position means employing a strategy that maintains a web page's SEO by, for example, maintaining the web page's position on a search results page.

In an embodiment, if, at 509, the data shows a preference to attack the web page's organic position, then at 510, a top-ranking keyword is used as anchor text. One skilled in the art will appreciate that any known and practicable way of determining a top-ranking keyword will be appropriate.

In an embodiment, if, at 509, the data shows a preference to defend the web page's organic position, then at 511, a keyword within a certain predefined striking distance is used as anchor text. In an embodiment, the striking distance is predefined by the ATC.

In an embodiment, once the determination to use a top ranking keyword or a keyword within striking distance is made, a determination is then made whether to use a long description as anchor text.

Figure 6:
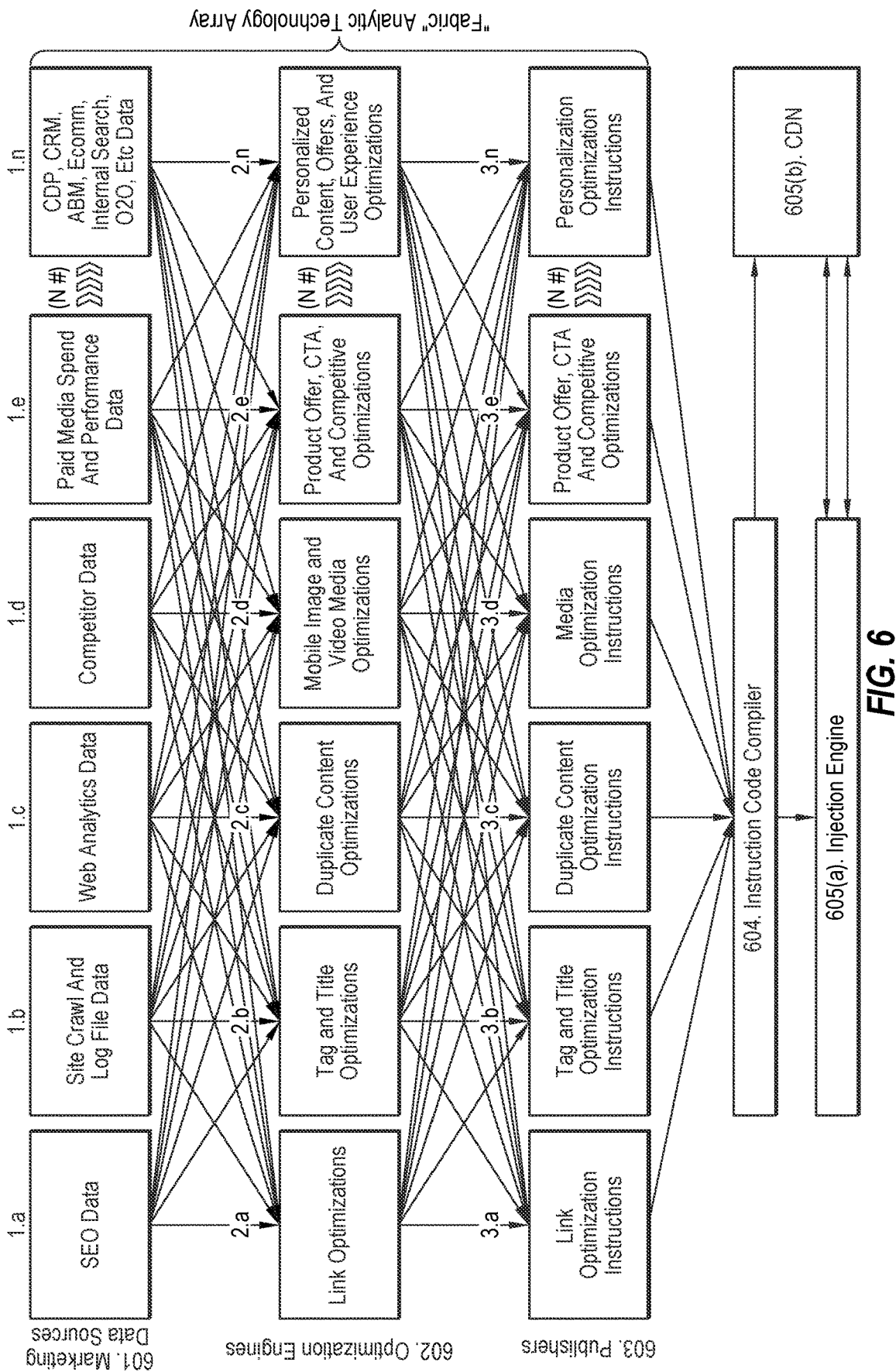
FIG. 6 is a high-level overview of a fabric analytic technology array.

FIG. 6 is a high-level overview of a system according to one or more embodiments. At 601, a processor receives data from one or more marketing data sources (the top row of modules). At 602, an optimization engine processes marketing data to determine/calculate optimizations (second row of modules). At 603, publishers assemble optimizations into sets of instructions, each instruction associated with one or more URLs/pages/page components (including but not limited to page fragments) or websites. At 604, a compiler organizes and formats instructions for one or more URLs/pages/page components (including but not limited to page fragments) or websites. At 605, (a): Injection module inject optimization instructions into pages/websites directly (see the Injection process flow), and at 605(*b*), an injection module instructs browser to fetch optimization instructions by retrieving such instructions from another webserver or CDN where the latest versions are stored, organized, and accessed. In an embodiment, the modules can be combined and configured in a variety of ways, and "optimizations" are of many kinds. In an embodiment, a cookie, device fingerprint, or pixel can be injected into a browser on a page. A variety of structures, functional components, features, graphical user display elements, code, or other constructs or elements can be injected. The variety of constructs or elements that can be injected into a web page are not limited the following, but can include offers, calls-to-action (CTA's), images, forms (e.g., data field presentation to be filled out by a user for entering personal data, to join a loyalty program, to get a reward, etc.), title tags, product descriptions, cookie consent bar/panel/button (as an example of a privacy permissioning feature), updated language in a privacy statement, interstitial pop-ups, chat dialog boxes, updated canonical URLs, and image alt text. These constructs or elements can also be automatically updated. The methodology can also be configured so that a site manager or owner is asked to pre-approve certain or all injections, either on specific pages or groups of pages.

The following description includes a description of embodiments related to an automated method of software code injection.

In an embodiment, the operator of a website downloads via API or FTP, or otherwise, receives via an email or some other mechanism, from a service, an SDK compatible with their website application stack. In an embodiment, the service can send the SDK in response to a specific request from the website operator, or in response to a web query, in response to a message from a third-party website, in response to any number of practicable, or for any other appropriate business or commercial or technical reason. The stack can be built using a variety of languages, including but not limited to C#, PHP, Python, and Java, or any appropriate language, and configured to insert code into one or more HTML, webpages on a website. Such SDK may be in any practicable format, including but not limited to a Zip file in the case of an email or download.

The SDK is installed into the website's application stack. The installation can be caused by the operator, by preconfigured instructions, by a third party, or by any technical and commercially appropriate source.

The SDK identifies one or more injection points for code and/or calls to be inserted into one or more pages on the website, such code configured to be read and executed by device browsers reading the webpage. In an embodiment, these injection points are found in the head-open or body-open sections of the HTML for a page. In other embodiments, these injection points are found in other parts of the webpage code.)

When a browser accesses the webserver and tries to fetch and read a page that has had instructions inserted into its HTML at various injection points, it reads those instructions and executes them. Such instructions could be to immediately modify some component of a page as described above, or alternatively to retrieve additional information or instructions from another web server, for example a content delivery network ("CDN"), or from another URL within the website. (In an embodiment, the instructions could be to fetch recently modified instructions, and/or to add additional optimization functionality not previously intended for the webpage.)

When the browser is instructed to retrieve additional information or instructions, the SDK communicates with a source server that has stored, manages, and/or provides access to the additional information or instructions intended for a webpage on the website, and retrieves the instructions that correspond to those associated with the webpage. In an embodiment, a source server could be a CDN, or any practicable configuration of a network server. If allowed by the webserver, the browser is then sent (delivered by the webserver or provided directly from the source webserver to the browser) the additional information or instructions associated with the page. Such instructions may be in the form of a software "capsule" for the page.

In one embodiment, the capsule is the same for one or more injection points for any given page. For example, in one embodiment the capsule would be the same in the event the browser executed the instructions to fetch a capsule at Point A insertion point higher in the HTML, for a webpage or at Point B insertion point which might be lower in the HTML, for a webpage.

In one embodiment, a variety of different types of instructions can be encapsulated into a single "capsule" for the page. For example, a single capsule for a webpage may contain multiple instructions and information that tell the browser to do one or more of a wide range of things, including but not limited to fetching certain optimized images & media data, creating or modifying metatags, titles, anchor text, links, or a variety of other types of content, such content including but not limited to a variety of offers, referencing a privacy policy or presenting a visitor privacy permission link or feature, or other personalized content or user experiences to optimize the content of the page for the end-user accessing the page.

Once the webpage is reconfigured using the steps above, it may be rendered, served, saved, or displayed. Alternatively, only the altered parts of the webpage may be rendered, served, or displayed. In an embodiment, the altered parts of the webpage are served and included in the webpage when it is displayed on an end-user device.

When a browser is instructed to retrieve additional information or instructions, in an embodiment, the SDK will have previously determined additional instructions regarding where a source server is located and which has additional information and instructions regarding where a source server is located and which contains additional information and instructions intended for a webpage on the website and retrieve the instructions that corresponding to those associated with the webpage. Such a source server could be a CDN. If allowed by the webserver, the browser is then provided with (delivered by the webserver or provided directly from the source webserver to the browser) the additional information or instructions associated with the page. This layering approach can be used to quickly return the page back from the web server and lay additional expensive calculation such as personalization of the page through one or more subsequent non-blocking calls.

The following description includes a top-down description of embodiments that include publishers.

An optimization, including one or more modules that, in an embodiment, determine and recommend optimizations for one or more URLs for various types of optimizations and categories of optimizations, receives a variety of marketing data from one or more sources, such sources including data from databases or from real-time and ad-hoc digital signal data or from other digital systems.

The marketing data can be sent or retrieved via API calls & feeds, FTP, Zip Files, or other practicable download mechanisms. In one embodiment, the marketing data can be delivered in batch mode, using pre-processed data stored in a database or webserver. In another embodiment, the data could be available on-demand, ad-hoc, real time, or near real-time basis and include more up-to-date and timely marketing data than might be available from pre-processed data previously stored in a database or webserver. By way of example only, but not exclusively, a search engine, site audit, or other "crawl" collection system may trigger a process for data collection about keyword rank, keyword volume information, keyword suggestions, etc., from search engines or a crawl of a website to analyze logs, bounce rates, on-page technical formatting errors, or other parameters about webpages and their content. An ad-hoc, real time or near real time data collection process could be initiated by a request from an optimization engine to a data source or such information could be continuously streamed as it is collected.

The sources of marketing data are configured to provide data, or a range of types of data, to one or more optimization engines. The data can include, but is not limited to, some combination of SEO data, log file analysis data, link analysis data, site audit data, web analytics data, competitive data, site structure data, marketing automation data, digital campaign data, paid media data, social signal data, internal search engine data, product information, ecommerce system data, end-user and audience identification and personalization data ("personalization data"), seasonality data, AB testing data, industry classification (for an enterprise's website(s)) and other data from a customer data platform (CDP), customer loyalty program, customer relationship management platform (CRM) or account based marketing (ABM) system, or any other marketing data that may become available at any time. Furthermore, such data may be available from website operators or from third-party systems or the operators of search engines (such as external search engines such as Google (Google Search console, Doubleclick, and Adsense) and internal search (sometimes called "site search") service providers and platforms such as but not limited to Elastic, Algolia, and Lucid). The following list of examples is not exhaustive, and is for illustrative purposes for one skilled in the art to extrapolate other specific cases, and more general cases:

In one example, SEO data may include a variety of data including but not limited to keyword rank for one or more URLs, keyword volume for one or more keywords on a search engine, keyword rank or location in carousels, local packs, quick answers, Share-of-Voice for a keyword, keyword suggestions, conversational keywords (for voice-centric search applications and situations), responses for voice-based queries, equivalent or comparable keyword translations in different languages for one or more keywords, visual parsing data regarding on a page different components appear on different end-user electronic devices and a broad range of various other SEO data of many kinds.

In another example, log file analysis data could include a variety of data including but not limited to data about pages crawled by one or more search engines, depth of search engine crawls, frequency and timing of search engine crawls, paths and patterns associated with search engine crawls, IP Address and host name, country or region of origin, user agent and browser and operating system used, information regarding direct access by the user or referral from another website or advertising source, type of search engine and search term entered, duration and number of pages visited by the user, page on which an end-user has left the website again, HTTP status code, date and time, method (Get or post), referrer (site from which a user comes), requested URL, top response codes, most requested pages (optionally broken out by subfolders), top errors (optionally top errors by subsection of a website) and other information regarding crawl budgets and other log file analysis data. Log analyzers collect data about how search engines crawl a website and based on these crawls how search engines determine how a website is structured, which pages a search engine will crawl, and in what order. A common industry term called "crawl budget" refers to the limit on the number of webpages on a site that a search engine will deem to be sufficiently important to crawl, with no guarantee that if a search engine does not crawl a given page in a first instance that it will later come back with a bot to re-scan those pages.

In another example, link analysis data could include a variety of data including but not limited to links and anchor text, quality of links, link sources, link recency, linking domains, clicks, etc. for one or more URLs or websites.

In another example, site audit data could include a variety of data including but not limited to data about duplicate content, page load times, defective URLs, missing or incorrectly formatted titles and tags for one or more URLs.

In another example, web analytics data could include a variety of data including but not limited to web analytics data about number and timing of visitors, page views, bounce rates, conversion rates, path analysis, time-on-page analytics data. All such data furthermore could be further segmented by type of device, geographic location. Furthermore, the data may be available on a periodic basis or on an ad-hoc "real-time" or near real time basis, or tracked over time or trended.

In another example, internal search data could include a variety of data including but not limited to keywords entered into an internal search engine for a website by an end-user, links provided by a response to an internal search query, and data about what end-users do after receiving a response to an internal search query.

In another example, competitive data could include a variety of data including but not limited to content that competes with content on one or more URLs, marketing offers being offered by one or more competitors, URLs and offers being tested on a website by a one or more competitors, structure and content elements and URL components on one or more URLs by one or more competitors, share-of-voice, share-of-market, geographic presence, advertising data, search performance, social media signal data.

In another example, an ecommerce system data could include data system for a product manufacturer marketer or a vertical channel marketplace (such as Amazon, eBay, Target, or another large commerce site) and include a variety of data including but not limited to product inventory, product pricing & discount/sale data, shopping cart abandonment data, average order size, keyword searches on an ecommerce site, search volume on an ecommerce site, characteristics of content on an ecommerce URL, manufacturer data, product reviews & ratings, product recommendations, product taxonomies, navigation facets, product listings and offers across different ecommerce websites, and the like.

In another example, personalization data could be any data about visitors to a page or web site collected using a range of tools and techniques involving the use of cookies, breadcrumbs, digital fingerprints, and pixels and the like to identify, monitor, and measure users, their online and offline (for example, in stores, on websites and in ecommerce systems) user experiences, behavior, purchases and preferences.

In another example, account based marketing (ABM) data could include but not be limited to reverse lookup data about the IP addresses of visitors, company names of webpage visitors, industries and audience segments of webpage visitors, and geographic location of webpage visitors, as well as device and browser information about those users and their relationships to an enterprise, including purchase and preferences and loyalty program information about them.

One or more optimization engines perform calculations and transforms on the data received from the marketing-data sources. These optimization engines, or modules, are computer code that can calculate and transform data using various combinations of one or more machine learning software and rules and best practices to identify, determine, recommend, or otherwise make available to a web service one or more optimizations for one or more UR I,s, page components, page content elements, end-user offers, or web sites. The machine learning software data mine the received data to generate, evaluate or test one or more algorithms and rules to determine which algorithms and rules are relevant to one or more optimizations and these algorithms can be optionally be combined with rules (or variations of both rules and algorithms) regarding one or more optimizations for one or more URLs, webpages, page components, page content elements, or web sites. Algorithmic transformations of the data may be used to reveal one or more insights about multiple factors and characteristics including but not limited to customer intent, stage of customer journey (researching, evaluating, purchasing), webpage and website structure, crawl budgets, optimum links, keyword landscapes, head, torso, and tail terms, taxonomies, facets, filters, product catalog structures, cross-channel effects, clusters, trends, patterns, location, conversational keywords, competitive dynamics, etc. as well as content format, components, elements and offers of various types to identify, determine, recommend, or otherwise make available to a web service one or more optimizations. Such optimizations for one or more URLs webpages, page components, page content elements, or web sites could include a variety of modifications, including but not limited to modifications of one or more URLs to, for example, correct on-page factors to fix technical errors, modify links to change the discoverability of one or more URLs or content, compress content or modify one or more page elements for access by an electronic device or type of browser to reduce speed load times, reduce duplicate content, boost page rank, increase conversion event rates, boost average order values, reduce shopping cart abandonment rates, modify link structures, modify one or more page elements to improve relevance of content for one or more keywords, modify or select specific product or service offers, display various calls-to-action ("CTA's") for one or more end-users, etc.

In one or more embodiments related to reducing or eliminating duplicate content (which is often penalized by many search engines in search results), there are multiple examples of errors and sub-optimal formats and page elements for which optimizations that could be identified and implemented to improve search performance, the user experience, and conversion events, including but not limited to (a) ways to modify pages to eliminate content that is duplicated on both HTTP and HTTPS; (b) ways to eliminate duplicated content due to URL capitalization; (c) ways to eliminate content across www and non-www (in one case by inserting an instruction to redirect the browser to the proper destination and/or eliminating the inferior destination) (d) ways to eliminate a slash at the end of a URL by modifying the URL; (e) ways to change pages so that they do not always defaulted to index.php.

In one or more embodiments related to many types of technical SEO features of a webpage, there are multiple examples of errors and sub-optimal formats and page elements for which optimizations could be identified and implemented to improve search performance, the user experience, and conversion events, including but not limited to ways to modify elements to optimize or "fix" elements by modifications or insertions for HI tags, meta descriptions, canonicals, alternate and HREF lang, instances where "rel=canonical" should appear, instances where there are redirect chains, missing image and alt attribute tags, broken images that do not render, out-of-date site maps, etc.

In one embodiment, involving image and video media page elements, there are multiple types of optimizations that could be identified for a page or website, including but not limited to optimizations to compress images and video to load faster or run more smoothly without interruption and to be compatible with different device/browser configurations and settings.

In one embodiment, there are conversational versions of keywords and keyword phrases that can be optimized for voice applications (such as applications where the end-user, for example, is engaged in calling a service provider vs getting navigational guidance to drive to a retail outlet) where things that relate to voice-to-text or step-by-step navigations are what end-users want to do or get information about and voice situations (such as situations where the end-user has his or her hands full or is in the car driving somewhere) where what end-users want to do is formulate queries using a voice interface.

In the event an optimization module does not itself determine, organize, store and/or maintain up-to-date optimizations for one or more web pages, optionally a secondary "compiler" software module can used to efficiently and effectively compile one or more optimizations related to one or more web pages. Typically, the compiler would assemble optimizations related to a web page in an organized manner for scaling, efficient maintenance, accountability, and performance. For example, a target web page might have multiple optimizations associated with one or more its page elements, and these optimizations together would be collected and associated with the corresponding identifier for that page. Furthermore, typically the compiler (or an optimization engine) would create the latest up-to-date optimizations for any given web page.

A set of related optimizations for a page, in turn, can be then received by an injection module that injects instructions into a page, or alternatively be received by a specially configured CDN from which the injection module (or a web browser for an electronic device) receives optimizations for a web browser to execute for a web page. In one embodiment, the latest version of any optimizations for a page are received by the browser, either from the injection module directly, or indirectly from the specially configured CDN. Software instructions injected into a page by the injection module, for instance, would instruct the browser when reading a page to fetch the latest version of instructions from the CDN for one or more web pages.

The relationship between optimization engines and marketing data sources is "many-to-many" in that any one or more optimization engines can receive marketing data from any one or more sources. Furthermore, more than one optimization engine can receive the same or similar data or subsets of data from the same or similar data source(s). Furthermore, for convenience or for system maintainability or performance, the functionality of an optimization engine may consist of functions combined across one or more other functions or alternatively its constituent functions can be separated into and performed by one or more optimization engines or alternatively combined with other optimization engines. comprised of one or more optimization engines. Furthermore, in addition to receiving data, an optimization engine can receive rules for "best industry practices" practices from a third-party source or directly from search engines themselves for URLs, websites and their constituent elements.

Similarly, the relationship between one or more optimization engines and one or more complier engines is such that certain tasks could be combined between one or more optimization modules and/or one or more publisher modules. In one embodiment, they could be one in the same. Desired levels of system architectural complexity, maintenance requirements, or overall system throughput and system performance objectives could result in a variety of configurations of such software modules and their relationships. Similarly, such relationships between optimizations and optimization compilers, in one embodiment could also be many-to-many.

Similarly, the relationship between one or more optimizations, compilers, and CDNs could be combined or separated variously to achieve desired levels of system architectural complexity, maintenance requirements, or overall system throughput and system performance.

In an embodiment, the output of one or more optimization engines, which consists of one or more recommendations to optimize elements or components of one or more web pages/URLs or websites, can be sent to an optional software module that evaluates and, optionally, predicts and selects or prioritizes one or more specific optimizations for one or more target URLs. Reducing the number of webpages impacted by modifications may be done to address system complexity, accountability, system throughput, or other reasons. In one or more such embodiments, the result could be a subset of pages or only certain categories of pages or types of content end up being targeted for subsequent optimizations of one or more kinds. Such optimizations, furthermore, could vary by type of company, characteristics of a web site, or other criteria. In one or more such embodiments, the pages targeted could be a small fraction of the webpages on a site that represent a disproportionate amount of web traffic or conversion events.

In one or more embodiments, particularly an enterprise's product catalogs & services change, competitive pages are launched, as search engine crawl paradigms and best practices change, as websites are restructured, as pages are being added and removed from websites, as things "break" in day to day operations, and as offers and content changes, the methods described above can adapt more or less automatically. Changes that otherwise typically might in the past required them being submitted to website managers and IT departments and be put into a queue and prioritized can be addressed more quickly, efficiently, and automatically and in much more commercially scalable ways using methods that automate detection of optimization opportunities, that can determine ways to optimate one or more page and web site components, elements and user offers, content, user experiences, and personalizations that can for which optimization instructions can be created and injected into pages and web sites and that can be thusly deploy and implemented by the interaction of electronic device browsers and webpages and websites. In one such embodiment, the system can effectively be "self-healing" in the sense that they can adapt to changing technical factors, competitive landscape, and the practical constraints of website operations and available technical resources and human talent and limitations.

In one or more embodiments, the output of one or more content optimization engines and publisher modules and the resulting performance metrics ("optimization outputs") associated with one or more implemented optimizations can be shared with, retrieved by, or passed back to a webserver associated with one or marketing platforms and databases, such platforms and databases including but not limited to marketing platforms and databases that are the source of marketing data which one or more content engines receive and process in their internal calculations and determinations. Furthermore, in one or more of these embodiments, the outputs of those marketing platforms and databases which use one or more optimization outputs for their own internal purposes and to further refine the precision and relevance of data being retrieved by content optimization engines and other webserver components of the system described herein. One example embodiment, and one not intended to be exhaustive, could be for an internal search function for a website. In this case, the output of the optimization outputs could be used generally or specifically to better inform and surface what URLs, offers, and other content to present and display in one or more formats on various electronic devices to an end-user in response to one or more internal search queries. Furthermore, such optimization outputs could be categorized and classified as being associated with certain attributes, including voice search attributes and those attributes associated with mobile search, media search, or device-specific search situations and applications, to provide one or more relevant, useful, and optimized content and offers to end-users and to increase conversion event success rates and values to a website operator or ecommerce platform in one or more of those situations and applications. Another example embodiment, and one not intended to be exhaustive, could apply to one or more marketing automation and marketing campaign systems, where optimization outputs could inform what keywords, products, offers, links, and other content and user experiences and optimizations to include in email marketing campaign copy and content to present and display in one or more formats on various electronic devices to an end-user in an email campaign or on associated Call-To-Action's. Another example embodiment, and one not intended to be exhaustive, could apply to one or more paid or promotional advertising systems to inform what keywords, products, offers, links, and other content and user experiences and optimizations to include in one or more paid or promotional digital ad copy and on landing pages for one or more paid or promotional digital advertising systems.

In another embodiment, the output of optimization engines could be tested before being fully deployed to all end-users of a website. Subsets of customers could be selected by another system, or optionally by the content optimization system, and these subsets of end-users could be presented one or more alternative webpage "treatments", components, offers, and user experiences for one more devices and web browsers to test the performance of each alternative. One or more results from one or more of such tests could be used to further "train" or otherwise inform algorithms, rules and machine learning processes used by one or more content optimization engines.

One or more modules and embodiments above could, for a skilled practitioner, could be combined in a variety of ways and the sequence and ordering of data processing steps and data transformations could be re-arranged in a variety of ways to achieve materially the same or similar optimizations and results for one or more optimizations.

In some embodiments, the processes in FIGS. 2-6, or any portion or combination thereof, can be implemented as software modules. In other embodiments, the processes in FIGS. 2-6, or any portion or combination thereof, can be implemented as hardware modules. In yet other embodiments, FIGS. 2-6, or any portion or combination thereof, can be implemented as a combination of hardware modules, software modules, firmware modules, or any form of computer code.

The following description includes a description of embodiments related to an automated method of software code injection. These embodiments may complement or provide additional functionality when combined with embodiments discussed above. For example, the automated method of software code injection may be utilized to inject into web pages of a web site code which serves to provide links to other web pages of the web site. Injecting these links may improve the SEO of a web site.

In some embodiments, a system for providing web assets (e.g., a web page) to a device with a specific configuration includes determining a grouping associated with the request for the web asset. Based on the grouping, the web asset is modified according to custom instructions embedded in the web asset (e.g., a Hyper Text Markup Language (HTML) element that enables customization, a JavaScript™ element that enables customization, a cascading style sheet (CSS) element that enables customization, etc.). The modification of the web asset includes the adding of group-specific steps, the hiding or removing of group-specific steps, and the changing of group-specific steps that are executed by the device to display the web asset. For example, the web asset includes custom instructions to display a full table of information for a laptop screen with a blue background, and only an abbreviated table for a portable phone screen with a white background. The custom instructions are used to modify the web asset so that the laptop screen and the portable phone receive different web assets (e.g., HTML instructions, JavaScript™ instructions, CSS instructions, etc.) that enable the customizations. In some embodiments, the web asset custom instructions preserve web asset functionality (e.g., do not break the web asset code, can run or be executed or interpreted with the custom instructions embedded, etc.). The custom instructions for modifying web assets may be packaged in an SDK as discussed above.

Web asset modification provides an efficient way to address the complexity presented by the diverse means of internet access today. A system engine integrates with any Java server and allows content creators to efficiently manipulate content without having to delve into the complexity of the mobile landscape. Web asset modification instructions are embedded into a web asset (e.g., HTML, CSS, etc.), which is parsed by the system engine and rendered according to the device requesting the page. At the core of the system engine is the concept of groups. A group is used to target a set of devices and is either selected from a pre-defined list (e.g., a predefined group) or is defined according to the needs of a developer (e.g., as defined using a group syntax), using a broad range of device attributes. Logical operators further extend flexibility in defining groups enabling customization of web assets.

In some embodiments, web asset modification for HTML type assets includes attribute overwriting. For example, rules to overwrite HTML attributes have the syntax form of tg-groupname-attribute=value. A sample rule which overwrites a green background color to blue for safari browser or touch-enabled phones is as follows: <div style="background-color: green" tg-safari,touchphone-style="background-color: blue; margin:-2px"; I>. Note that multiple groups can be separated by comma(s) without any restrictions—for example, a group is a combination of custom group(s) and pre-defined group(s). As another example, rules to show and hide HTIVIL attributes have the form of: tg-groupname-$action=value, where the value is "hide" or "show". In another example, a div which is only to be shown to devices that fall into mygroupl or touchphone is represented as <div tg-mygroupl,touchphone-$action="show"/>.

In some embodiments, web asset modification for JavaScript type assets includes overwriting, showing and hiding. For example, rules to show and hide JavaScript snippets within the code have the form of <script tg-groupname-$action-value/>, where value is "hide" or "show". For another example, the snippet below will only be displayed on iPhone devices (devicetype=phone AND os=iOS). Note the use of '+' for an AND operation.

```
<script tg-ios+phone-$action="show">
    alert("This is an iPhone!");
</script>
```

In some embodiments, web asset modification for CSS type assets includes attribute overwriting. For example, rules within the CSS code result in the CSS being selectively rendered according to the device requesting the page. CSS rules are similar to HTML rules. The CSS syntax has the form: tg-groupname-attribute:value. In the example below, the float: left property is overridden for devices from group iphone:

```
#mydivId
{
    float: left;
    tg-i phone-fl oat: right;
}
```

In some embodiments, rules are used to manipulate link tags: <link rel="stylesheet" href="small.css" tg-iphone-href="big.css" tg-blackberry-$action="hide"/>. In the example, big.css is used for iPhone devices, a link is hidden for BlackBerry devices, and small.css is used for all other devices. Altering the appearance of links may be performed in conjunction with automatically linking webpages to improve SEO as discussed above. Also, the appearance of links may be performed to improve SEO based on differences between users of different devices. In another example, CSS rules are used to hide and show style tags. This is useful for limiting the CSS that is sent to a certain category of devices. For example,

```
<style tg-iphone-$action="hide" type="text/css">
#idl
{
    color: blue;
    font-size: 12px;
}
</style>
```

In some embodiments, web asset modifications use groups to target experiences and functionality to defined sets of users (e.g., iPhone users, Tablet users, etc.). The framework allows users to use:

Pre-defined groups: These are provided by the framework to quickly target commonly used device categories. Pre-defined groups are directly used within the HTML, or CSS as follows: <div style="background-color: green" tg-iphone-style="background-color: blue; margin:-2px";/>. Here, tg is a unique prefix to identify web asset modification specific syntax and iphone is a pre-defined group constant.

Custom groups: These are user-defined groups which are a combination of predefined group constants. For example, a user can target Firefox browsers running on android 4.x by combining multiple categories:

```
<Group name="firefoxOnAndroid4x">
    <Category name="browser" value="firefox" I>
    <Category name="os" value="android 4x" />.
</Group>
```

This group is used in HTML, as follows: <div style="background-color: green" tg-firefoxOnAndroid4x-style="background-color: blue; margin:-2px"; I>

In an example, groups are used to target experiences and functionality to defined sets of users. The framework allows users to use pre-defined groups or define custom groups by picking attributes of the devices that would fall into that category. Categories include browser, devicetype, os, screenwidth, dpi, format, and feature. Pre-defined groups are as follows:

1) for browser: safari, chrome, native, firefox, skyfire—e.g., operamini, operamobile, bolt, openwave, obigo, telca, netfront, blazer, polaris, dolphin, ucweb, and silk;
2) for devicetype: phone{nontouchphone, touchphone}, iphone, ipod, desktop, tablet, ipad, ipadmini, fire, and surface;
3) for os: ios, android, blackberry, windows, bada, webos, and symbian;
4) for screenwidth: width[number] (e.g., width320);
5) for pixeldensity or dpi, dpiretina (e.g., 261 and above), dpimedium (e.g., 131-260), and dpilow (e.g., 130 and below);
6) for format: mp3, mp4, m4a, wmv, ogg, way, mpeg, mov, fly, webm, h264, png, gif, jpg, jpeg, and svg;
7) for feature: css3, nocss3, offlinestorage, nooffinestorage, gps, nogps, fileupload, nofileupload, flash, noflash, cookies, nocookies, camera, nocamera, multilingual, nomultilingual, webkit, nowebkit, jssupport advancejssuport, basicjssupport}, nojssupport, htm15, nohtm15, touch, and notouch.

Categories used to target defined sets of users may be used to improve SEO. Linking webpages may be accomplished utilizing these categories to improve SEO. Different sets of links may be visible to different defined sets of users based on categories.

In some embodiments, custom groups are defined in a group file and are common for all accessing the server. In some embodiments, custom groups are defined in a group file that is accessible or associated with a specific group of requestors or IP addresses.

In some embodiments, a custom group definition is of the form:

```
<Group name="groupName">
    <Category name="browser" value="safari, firefox" />
    <Category name="os" value="android2.2_ge" I>
    <Category name="devicetype" value="tablet" />
    <Category name="screen" value="width320, width450_gt" I>
    <Category name="pixeldensity" value="dpiretina" />
    <Category name="feature" value="gps, htm15, camera" I>
    <Category name="format" value="mp3,mp4jpg" />
</Group>
```

Note that values within each category separated by comma ',' are OR'ed, while the categories themselves are AND'ed to create the group. For example, the group chromeOnPhones below targets chrome browser AND the OS is either (ios or android) AND devicetype is phone:

```
<Group name="chromeOnPhones">
    <Category name="browser" value="chrome" />
    <Category name="os" value="ios,android" />
    <Category name="devicetype" value="phone" />
</Group>
```

Values within each category separated by plus sign '+' are AND'ed. For example, the group myAndroid1 below targets android the OS AND has (both mp3 AND jpg) format support:

```
<Group name="myAndroid1">
    <Category name="os" value="android" I>
    <Category name="format" value="mp3+jpg" />
</Group>
```

Custom groups also offer the power of combining AND and OR operations. For example, the group myAndroid2 below targets android OS AND has either (html5 OR (both css3 AND offlinestorage)) features:

```
<Group name="myAndroid2">
    <Category name="os" value="android" I>
    <Category name="feature" value="html5,css3+offlinestorage" />
</Group>
```

In some embodiments, custom groups are able to use any category name and/or category value (e.g., in a list of pre-defined groups) in any combination as part of their definition.

In some embodiments templates are used to invoke packaged modules within the system framework, which offer compatibility across a range of devices and easy integration of complex features that otherwise might require multiple compatibility and rendering checks. This allows for automatically injected links between webpages to function across a range of devices.

This may allow for one set of links between webpages which functions across a range of devices. This results in more uniform SEO across a range of devices. Templates are invoked using the syntax (starts with <tg-):

<tg-templatename attribute1="v 1" attribute2="v2">

The attributes & inner HTML of the template element depend on the template design. Consider a template—myphonenumber. The template filename should start with "tg-" followed by the templatename and ends with ".template"—for example, tg-myphonenumber.template. The template can be created just like an HTML page—HTML elements and styles should be specified with device specific display rules if needed.

```
<html>
  <body>
    <div tg-iphone-$action="show">
      <a href="tel:${XPATH=tg-myphonenumber}" style="colorblue;" >Click Me</a>
    </div>
    <div tg-iphone-$action="hide">
      <span style="color:green;" > Please call $(XPATH=tg-myphonenumber) </span>
    </div>
  </body>
</html>
```

In this example, the click to call link is to be shown for iPhones, while other devices see the phone number in plain text. XPATH expressions are used to obtain the content from the template invocation in the user's HTML code. XPATH syntax in template definitions starts with "${XPATH=" and ends with "}". The value should be the exact xpath expression from where the data is to be extracted. Note: The root node is tg-myphonenumber so the /html/body path ({XPA'TH=/html/body/tg-myphonenumber}) doesn't have to be specified. Usage of a template within HTML, is as follows:

```
<html>
  <body><tg-myphonenumber>1234567890</tg-myphonenumber></body>
</html>
```

In this example, the inner HTML (e.g., 1234567890) of the tg-myphonenumber element is grabbed by the xpath expression specified on the template file. The final rendered html page when accessed from an iPhone device is as follows:

```
<html>
  <body><div>
    <a href="tel:1234567890" style="color:blue">Click Me</a>
  </div></body>
</html>
```

The output for non-iPhone devices is as follows:

```
<html>
    <body><div>
        <span style="color:green">Please call 1234567890</span>
    </div></body>
</html>
```

In an example, operators are supported within group definitions. An operator is the last set of characters except in the event that there is range information provided with operate on both custom group definitions and on the attribute level. Operators may have a corresponding symbol. For example, operator 'equal' (exact value) has no corresponding symbol, and an example of usage as 'ios4'. Also, operator 'greater than' has symbol '_gt', and an example of usage is 'ios4_gt'. Operator 'less than' has symbol '_lt' and an example of usage is 'ios4_lt'. Operator 'greater than or equal to' has symbol '_ge', and an example of usage is 'ios4_ge'. Operator 'less than or equal to' has symbol '_le', and an example of usage is 'ios4_le.' Operator 'not' has symbol 'not', and an example of usage as 'ios4_not'. Operator 'range' has symbol 'to', and an example of usage as 'ios4.1to4.8'. Operator 'series' (can be combined with other operators) has symbol 'x', and examples of usage as 'ios4x' or 'ios4xto5x' or 'io4xnoe. Operator 'or' has symbol and an example of usage is ios,android,firefox,tablef. Operator 'and' has symbol '+' and an example of usage is 'safari+touchphone+ios4x'.

Operators are usable for custom group definitions and on the attribute level. In some embodiments, the comparison operands (e.g., greater than, less than, greater than or equal to, less than or equal to, and not) where appropriate—for example, with regard to OS versions (e.g., where greater corresponds to a later version, where lesser corresponds to an earlier version) and with regard to screen width (e.g., where greater corresponds to a larger screen size, and lesser corresponds to a smaller screen size)—for example, <img tg-ios4.1_gt-$action="hide"/>, which indicates an operating system version of iOS greater than 4.1; or, <img tg-width320 le-$action="hide"/>, which indicates that a screen width is less than or equal to 320; but not, <img tg-safari_gt-$action="hide"/>, because there is no such thing as greater than safari). In some embodiments, the operator 'not' is applicable to all categories (e.g., browser, os, format, dpi, screen, etc.)—for example, safari_not, android not, ios3x_not, ios4.0_not, width320_not. In some embodiments, greater pixeldensity comprises a higher density and lesser pixeldensity comprises a lower density.

In some embodiments, a Groups file containing the custom group definitions for a given site is maintained at STOMCATHOME/webapps/ROOT/WEB-INF/core/niles/groups.xml which is configurable via web.xml. A sample group file is as follows:

```
<GroupList>
    <Group name="mySafariIOS">
        <Category name="browser" value="safari" />
        <Category name="os" value="ios"/>
    </Group>
    <Group name="myChromeAndroid">
        <Category name="browser" value-"chrome" />
        <Category name="os" value="android"/>
    </Group>
</GroupList>
```

In this example, two groups are defined: mySafariIOS which targets devices running iOS with safari browser, and myChromeAndroid which targets devices running android with chrome browser.

In some embodiments, server-side page redirection is done using the "tg-redirect" meta tag—for example, <meta name="tg-redirect" content="iphone='URL1'; android-IIRL2'"/>. Note the usage of single and double quotes inside the content field. In various embodiments, the redirection URL specified is an absolute link (http:// or www.) or a relative link (/). For example, <meta name="tg-redirect" content="iphone='www.domain.com/iphone'; android='www.domain.com/android'"/>.

In some embodiments, the file containing the device detection updates by user-agent for a given site is maintained at $TO/VICATHOME/webapps/ROOT/WEB-INF/core/rules/devicepatch.xml (configurable via web.xml). This file allows users to modify the characteristics of certain User Agents at a server level in order to provide enhanced flexibility within the framework. A sample patch file is as follows:

```
<DevicePatchList>
    <Device Useragent="ZTE-C88/1.0 SMIT-Browser/2.0.0" Screen="240"
    Format="jpgjpeg,png,mp3"
    Feature="nocamera,noflash,nohtm15,notouch"
        Devicetype="phone"/
> </DevicePatchList >
```

In some embodiments, embedded instructions in a web asset are interpreted using a post-processor. The post-processor analyzes the web asset and determines if there are instructions to add to, to modify, or to remove elements of the web asset. In various embodiments, the web asset includes embedded instruction embedded in HTML, in CSS, in Javascript, or any other appropriate web asset instructions.

In some embodiments, an HTML embedded instruction includes the ability to overwrite an attribute or instruction, to show or hide instructions, to overwrite javascript, to link webpages of a website to improve SEO as discussed above, or any appropriate instruction. For example, rules to overwrite attributes or instructions are of the form: tg-groupname1,groupname2-attribute=value. Note that it is customary for an HTML attribute that starts with 'tg-'. In some embodiments, a rule which overwrites a green background color to blue for safari browser or touch-enabled devices is as follows: <div style="background-color: green" tg-safari, touch-style="background-color: blue; margin:–2px"; />. Note that multiple groups can be used separated by comma without any restrictions (e.g., groups can be custom groups, pre-defined groups, or a combination of custom and pre-defined groups). For example, rules to overwrite attributes are of the form: tg-groupname1,groupname2-$action=value, where the value is either 'hide' or 'show'. Note that it is customary for an HTML attribute that starts with 'tg-'. In some embodiments, a rule which overwrites a green background color to blue for safari browser or touch-enabled devices is as follows: <div style="background-color: green" tg-safari,touch-style="background-color: blue; margin:–2px";/>. For example, a 'div' (e.g., a division or section in an HTML document, a tag, etc.) which is only to be shown to devices that fall into mygroupl or touch-enabled is represented as <div tg-mygroupl,touch-$action="show"/>. In some embodiments, rules to show and hide JavaScript snippets within the code are of the form: <script tg-groupname1,groupname2-$action-value/>, where value can be 'hide' or 'show'. For example, the snippet below will only be displayed on iPhone devices (e.g., devicetype=phone AND os-iOS):

```
<script tg-ios,phone-$action="show">
    alert("This is an iPhone!");
</scri pt>
```

In some embodiments, a CSS embedded instruction includes the ability to overwrite an attribute or instruction, to restrict to certain groups, to manipulate tags, to show or hide tags, to overwrite javascript, to link webpages of a website to improve SEO as discussed above, or any appropriate instruction. For example, rules within the CSS code result in the CSS being selectively rendered according to the device requesting the page; CSS rules are similar to HTML rules and have a format of: tg-groupname1,groupname2-attribute:value. In the example below, the 'float: left' property will be overridden for devices from group g3.

```
#mydivId
{
    float: left;
    tg-g3-float:right;
}
```

In some embodiments, CSS rules are used to hide and show style tags. This is useful for limiting the CSS that is sent to a certain category of devices. This may be done to improve SEO for a webpage for the category of devices by showing or hiding links based on the category of devices. This may also limit the CSS that is sent to the category of devices in other ways. For example, where the instructions below indicate that when the group is gl, then the instructions that font color is blue and font-size is 12px are hidden:

```
<style tg-g1-$action="hide" type="texticss">
#id 1
{
    color: blue;
    font-size: 12px;
}
</style>
```

In some embodiments, tags are used to invoke available packaged modules, which offer compatibility across a range of devices and easy plug-in of complex features that otherwise might require multiple compatibility and rendering checks. Tags are invoked using the following syntax (e.g., starting with '<tg-'):
<tg-tagname attribute1="v1" attribute2="v2">
For example, a tag which adds appropriate click to call links on devices is as follows:
<tg-phonenumber>40877777</tg-phonenumber>
In another example, the image gallery tag adds a custom image gallery that degrades the user experience based on the device accessing the page:

```
<tg-imagegallery>
    <tg-option value="Url1">
    <tg-option value="Url2">
</tg-imagegallery>
```

In an example, keywords include 'tg-', and '-' (hyphen as separator). For example, for '$action' examples include '$action="show"', '$action="hide"'. For example, for 'tg-' examples include: '<img tg-iphone-$action="hide"/> or '<tg-phonenumber>12345678</tg-phonenumber>'. For example, for a CSS attribute '-' is used as a separator:

```
Span{
    Float:left
    tg-gl-float:right
)
``` or as an element attribute:
<img src='url" tg-gl-src="url2">
In examples, web asset code for display of an image on devices is as follows:

```
<div class="one" tg-ipad-$action="show" tg-iphone-$action="show" tg-
android-$action="show"> <a href="#">
    <h4>Image Size: 51KB</h4>
    <span>Disney Buys Lucasfilm, New Star Wars Coming in 2015</
span
    <img src="images/ipad/starwars.jpg" alt="Star Wars bought by Disney" /
</a></div>
<div class="two" tg-ipad-$action="show" tg-iphone-$action="hide" tg-
android-$action="hide"><a href="#">
    <h4>Image Size: I 76KB</h4>
    <span>The Story of Earth in 90 Amazing Seconds</span>
    <i mg src=" mages/ipad/earth .jpg" al t:::" Earth">
</a></div>
```

Such code may be used to display different content to different devices or categories of devices. This code may also be used to embed links in web pages and show different links to different devices of categories of devices. This may be done to improve the SEO of the website. Improved SEO may allow the web site to better target ads to consumers. Web asset code for showing different ads is as follows:

```
<a href="" class="iphone"><img tg-ipad-$action="hide" tg-iphone-
$action="show" tg-android-$action="hide" src="ads/best_buy_iphone.
png" /></a>
<a href="" class="android"><img tg-ipad-$action="hide" tg-iphone-
$action="hide" tg-android-$action="show" src="ads/best_buy_android.
png" /></a>
```

In some embodiments, a post processor uses web asset modification code and hides or shows instructions as appropriate.

As indicated above, the embodiments described herein may include various computer hardware or software modules. Further, as indicated above, embodiments described herein may be implemented using computer-readable media for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

We claim:

1. A method comprising:

accessing a website comprising one or more active webpages;

selecting, by a processor, one of the one or more active webpages as a selected webpage the selected webpage being an active webpage that is publicly available;

analyzing, by the processor, a plurality of factors of the selected webpage, the plurality of factors including: keywords used to search for the selected webpage and webpages used by users to navigate to or from the selected webpage;

analyzing a plurality of webpages, which does not include the selected webpage, using the plurality of factors of the selected webpage to identify one or more irrelevant webpages;

removing the one or more irrelevant webpages from the plurality of webpages to generate a set of relevant webpages;

after removing the one or more irrelevant webpages, sorting the set of relevant webpages based on one of: search volume of keywords within webpages of the set of relevant webpages, a conversion analysis of the webpages of the set of relevant webpages, and a striking distance from a particular search engine result position of the webpages of the set of relevant webpages;

in response to sorting the set of relevant webpages, determining, by the processor, a modification to the selected webpage using the sorted set of relevant webpages, the modification configured to change an element of the selected webpage that is displayed to a user when the selected webpage is rendered by a device browser of the user;

determining, by the processor, software code configured to enact the modification;

determining, by the processor, instructions configured to insert the software code into the selected webpage of the website while the selected webpage is active and publicly available; and installing the instructions into an application stack of the website so that the device browser of the user, executing code of the website to render the selected webpage for display to the user, executes the software code, the instructions altering how the selected webpage is rendered for display while the selected webpage is active and publicly available.

2. The method of claim 1, wherein the modification includes one or more of the following: modification to a content characteristic of the selected webpage and a new feature to the selected webpage.

3. The method of claim 1, wherein the instructions include additional instructions to retrieve the software code from a server and provide the software code to the device browser for execution by the device browser to add functionality to the selected webpage.

4. The method of claim 1, wherein the determining the modification to the selected webpage further includes determining a link to display on the selected webpage when the selected webpage is rendered, the link including a uniform resource locator to a link webpage in the set of relevant webpages.

5. The method of claim 4, wherein the determining the modification to the selected webpage further includes determining text to be displayed as the link, the text determined based on a characteristic of the link webpage.

6. The method of claim 5, wherein the characteristic is one or more of the following: a headline of the link webpage, a page title of the link webpage, a social title of the link webpage, a meta description of the link webpage, and a keyword associated with the link webpage.

7. The method of claim 4, wherein the determining the modification to the selected webpage further includes selecting the link webpage from the set of relevant webpages, the link webpage selected based on a conversion rate for each of the set of relevant webpages and/or a search volume associated with each of the set of relevant webpages.

8. The method of claim 4, wherein the software code configured to enact the modification includes software code configured to cause the selected webpage to include the link for display when the selected webpage is rendered by the device browser.

9. One or more non-transitory computer-readable media comprising instructions which, when executed by a processor, are configured to cause the processor to perform one or more operations, the operations comprising:

accessing a website comprising one or more active webpages;

selecting one of the one or more active webpages as a selected webpage, the selected webpage being an active webpage that is publicly available;

analyzing a plurality of factors of the selected webpage, the plurality of factors including: keywords used to search for the selected webpage and webpages used by users to navigate to or from the selected webpage;

analyzing a plurality of webpages, which does not include the selected webpage, using the plurality of factors of the selected webpage to identify one or more irrelevant webpages;

removing the one or more irrelevant webpages from the plurality of webpages to generate a set of relevant webpages;

after removing the one or more irrelevant webpages, sorting the set of relevant webpages based on one of: search volume of keywords within webpages of the set of relevant webpages, a conversion analysis of the webpages of the set of relevant webpages, and a striking distance from a particular search engine result position of the webpages of the set of relevant webpages;

determining a modification to the selected webpage based on the sorted set of relevant webpages, the modification configured to improve a search engine optimization (SEO) of the website;

determining software code configured to enact the modification;

determining instructions configured to insert the software code into the selected webpage of the website while the selected webpage is active and publicly available; and installing the instructions into an application stack of the website so that a device browser of a user, executing code of the website to render the selected webpage for display to the user, executes the software code, the instructions altering how the selected webpage is rendered for display while the selected webpage is active and publicly available.

10. The one or more non-transitory computer-readable media of claim 9, wherein the modification includes one or more of the following: modification to a content characteristic of the selected webpage and a new feature to the selected webpage.

11. The one or more non-transitory computer-readable media of claim 9, wherein the instructions include additional instructions to retrieve the software code from a server and provide the software code to the device browser for execution by the device browser to add functionality to the selected webpage.

12. The one or more non-transitory computer-readable media of claim 11, wherein the determining the modification to the selected webpage further includes determining a link to display on the selected webpage when selected webpage is rendered, the link including a uniform resource locator to a link webpage in the set of relevant webpages.

13. The one or more non-transitory computer-readable media of claim 12, wherein the determining the modification to the selected webpage further includes determining text to be displayed as the link, the text determined based on a characteristic of the link webpage.

14. The one or more non-transitory computer-readable media of claim 13, wherein the characteristic is one or more of the following: a headline of the link webpage, a page title of the link webpage, a social title of the link webpage, a meta description of the link webpage, and a keyword associated with the link webpage.

15. The one or more non-transitory computer-readable media of claim 12, wherein the determining the modification to the selected webpage further includes selecting the link webpage from the set of relevant webpages, the link webpage selected based on a conversion rate for each of the set of relevant webpages and/or a search volume associated with each of the set of relevant webpages.

16. A method comprising:

accessing a website comprising one or more active webpages;

selecting, by a processor, one of the one or more active webpages as a selected webpage, the selected webpage being an active webpage that is publicly available;

analyzing, by the processor, a plurality of factors of the selected webpage, the plurality of factors including:

keywords used to search for the selected webpage and webpages used by users to navigate to or from the selected webpage;

analyzing a plurality of webpages, which does not include the selected webpage, using the plurality of factors of the selected webpage to identify one or more irrelevant webpages;

removing the one or more irrelevant webpages from the plurality of webpages to generate a set of relevant webpages;

after removing the one or more irrelevant webpages, sorting the set of relevant webpages based on a striking distance from a particular search engine result position of the webpages of the set of relevant webpages;

determining, by the processor, a modification to the selected webpage based on the sorted set of relevant webpages, the modification configured to change an element of the selected webpage that is displayed to a user when the selected webpage is rendered by a device browser of the user;

determining, by the processor, software code configured to enact the modification;

determining, by the processor, instructions configured to insert the software code into the selected webpage of the website while the selected webpage is active and publicly available; and installing the instructions into an application stack of the website so that a device browser of a user, executing code of the website to render the selected webpage for display to the user, executes the software code, the instructions altering how the selected webpage is rendered for display while the selected webpage is active and publicly available.

17. The method of claim 16, wherein the instructions include additional instructions to retrieve the software code from a server and provide the software code to the device browser for execution by the device browser to add functionality to the selected webpage.

* * * * *